US009813001B2

(12) United States Patent
Akimatsu et al.

(10) Patent No.: US 9,813,001 B2
(45) Date of Patent: Nov. 7, 2017

(54) CONTROL DEVICE FOR ROTATING ELECTRIC MACHINE

(71) Applicants: DENSO CORPORATION, Kariya, Aichi-pref. (JP); ASMO CO., LTD., Kosai, Shizuoka-pref. (JP)

(72) Inventors: Ryunosuke Akimatsu, Kariya (JP); Tatsuya Tonari, Kariya (JP); Toshihiro Uchida, Kosai (JP)

(73) Assignees: DENSO CORPORATION, Kariya (JP); ASMO CO., LTD., Kosai (JP)

( * ) Notice: Subject to any disclaimer, the term of this patent is extended or adjusted under 35 U.S.C. 154(b) by 0 days.

(21) Appl. No.: 15/160,386

(22) Filed: May 20, 2016

(65) Prior Publication Data

US 2016/0344314 A1  Nov. 24, 2016

(30) Foreign Application Priority Data

May 20, 2015  (JP) ................................. 2015-102664
Jan. 7, 2016  (JP) ................................. 2016-001799

(51) Int. Cl.
*H03K 5/00* (2006.01)
*H02P 6/10* (2006.01)
*H02P 29/50* (2016.01)
*H02P 6/06* (2006.01)
*H02P 6/14* (2016.01)

(52) U.S. Cl.
CPC ................ *H02P 6/10* (2013.01); *H02P 29/50* (2016.02); *H02P 6/06* (2013.01); *H02P 6/14* (2013.01); *H02P 2209/07* (2013.01)

(58) Field of Classification Search
CPC .......... H02P 2209/07; H02P 6/10; H02P 6/06; H02P 6/14; H02P 6/08
USPC ....................................................... 318/400.2
See application file for complete search history.

(56) References Cited

U.S. PATENT DOCUMENTS

2005/0073280 A1* 4/2005 Yoshinaga ................ H02J 3/01
                                                    318/727
2005/0210900 A1* 9/2005 Oomura ............... B60H 1/3214
                                                    62/228.1

FOREIGN PATENT DOCUMENTS

JP       2007-312520 A    11/2007
JP       2017-70000 A      4/2017

* cited by examiner

*Primary Examiner* — Kawing Chan
*Assistant Examiner* — Bradley Brown
(74) *Attorney, Agent, or Firm* — Oliff PLC

(57) ABSTRACT

A control device capable of suppressing electromagnetic force applied to a motor has a harmonic current calculation section and an operation section. The harmonic current calculation section calculates amplitude and phase of each of harmonic currents to be superimposed over a fundamental current which flows in phase windings of a stator of the motor based on conditions relating to load change of the motor. The operation section generates and transmits instruction signals to an inverter so that the calculated superimposed harmonic currents flow in the phase windings of the stator.

12 Claims, 8 Drawing Sheets

REDUCTION OF TENTH AND TWELFTH
ELECTROMAGNETIC FORCE COMPONENTS

REDUCTION OF FOURTEENTH AND TWELFTH
ELECTROMAGNETIC FORECE COMPONENTS

REDUCTION OF FOURTEENTH AND TWELFTH ELECTROMAGNETIC FORCE COMPONENTS

PHASE [deg] OF ELEVENTH HARMONIC CURRENT

ROTATION SPEED [rpm]

AMPLITUDE [A] OF THIRTEENTH HARMONIC CURRENT

ROTATION SPEED [rpm]

PHASE [deg] OF THIRTEENTH HARMONIC CURRENT

ROTATION SPEED [rpm]

CONTROL DEVICE FOR ROTATING ELECTRIC MACHINE

CROSS-REFERENCE TO RELATED APPLICATION

This application is related to and claims priority from Japanese Patent Applications No. 2015-102664 filed on May 20, 2015, and No. 2016-001799 filed on Jan. 7, 2016, the contents of which are hereby incorporated by reference.

BACKGROUND OF THE INVENTION

1. Field of the Invention

The present invention relates to control devices for rotating electric machines.

2. Description of the Related Art

There has been proposed a control device for rotating electric machines capable of reducing noise or radiated noise in a rotating electric machine generated during the rotation of the rotating electric machine. Such conventional control devices suppress electromagnetic force induced in the radial direction of the rotating electric machine in order to reduce radiated noise.

Patent document 1 discloses such a conventional control device for rotating electric machines. The control device disclosed in patent document 1 is applied to an inner rotor type rotating electric machine, and reduces m-th order electromagnetic force component because it is effective to reduce a 6M-th electromagnetic force component applied in a radial direction to a stator.

In a concrete example, the control device for rotating electric machines disclosed in patent document 1 calculates a fundamental current on the basis of a torque instruction value and a motor rotation speed, and superimposes a harmonic current over the fundamental current. In this case, the harmonic current has an angular velocity of 6M−1 or 6M+1 times a rotation angular velocity of the fundamental current. This control makes it possible to reduce the 6M-th electromagnetic force component applied to the stator of the rotating electric machine.

By the way, such noise is generated by the electromagnetic force applied to a rotor in a radial direction when the rotating electric machine is an outer rotor type. For this reason, it is desired to reduce the electromagnetic force applied to the rotor in such outer rotor type rotating electric machines.

However, there is a possible change such that the load of the rotating electric machine varies even if the rotation angular velocity of the fundamental current is constant. When the load of the motor varies, there is a possible risk that it is difficult to correctly reduce electromagnetic force which causes noise if the harmonic current having the same condition before the change of the load of the rotating electric machine is superimposed over the fundamental current.

SUMMARY

It is therefore desired to provide a control device for rotating electric machines capable of effectively reducing electromagnetic force which causes noise such as magnetic noise if loads of the rotating electric machine change.

An exemplary embodiment provides a control device for rotating electric machines to be arranged in a rotating electric machine system. The rotating electric machine system has an electric power conversion unit such as an inverter, and a rotating electric machine such as a motor. The rotating electric machine has a rotor and a stator. Phase windings are wound on the stator. The electric power conversion unit supplies a drive current to the phase windings of the stator so as to drive the rotating electric machine. The control device has a harmonic current calculation section and an operation section. The harmonic current calculation section calculates harmonic currents to be superimposed over a fundamental current supplied to the phase windings of the stator so as to suppress electromagnetic force applied to the rotating electric machine.

The operation section is capable of operating the electric power conversion unit so that the drive current including the calculated harmonic currents which have been superimposed over the fundamental current flow in the phase windings of the stator. The harmonic current calculation section calculates the amplitude and phase of the harmonic currents to be superimposed over the fundamental current on the basis of conditions relating to a load of the rotating electric machine.

The control device can calculate the harmonic currents to be superimposed over the fundamental current which is supplied to the phase windings of the stator of the rotating electric machine. Further, the control device uses, as the drive current, the current in which the harmonic currents have been superimposed over the fundamental current. When the rotating electric machine receives the drive current, the received drive current flows in the phase windings of the stator, and a rotor of the rotating electric machine rotates.

The operation section calculates the amplitude and phase of the harmonic currents to be superimposed over the fundamental current on the basis of the conditions relating to the variable load of the rotating electric machine. Accordingly, if the load of the rotating electric machine varies, the harmonic currents corresponding correctly to the varied load of the rotating electric machine are superimposed over the fundamental current. It is therefore possible for the control device to effectively reduce electromagnetic force components which cause noise.

Even if the rotation angular velocity of the fundamental current is constant, there is a possible change in amplitude and phase of the fundamental current due to the variation of the load of the rotating electric machine. When the conditions of the fundamental current are changed, there is a risk that it is difficult to effectively eliminate electromagnetic force components causing noise even if the harmonic currents before the change of the conditions of the fundamental current are superimposed over the fundamental current.

On the other hand, the harmonic current calculation section in the control device according to the present invention can calculate the amplitude and phase of the harmonic currents to be superimposed over the fundamental current on the basis of the conditions of the fundamental current which correctly relate to the change of load of the rotating electric machine.

In accordance with another aspect of the present invention, there is provided the control device further having an acquiring section. The acquiring section detects the fundamental current flowing in the phase windings of the stator of the rotating electric machine. The conditions of the fundamental current flowing in the phase windings of the stator are used as the conditions corresponding to the load of the rotating electric machine.

The harmonic current calculation section calculates the amplitude and phase of the harmonic currents to be superimposed over the fundamental current which flows in the phase windings of the stator on the basis of a correlation relationship between the conditions of the fundamental current and the amplitude and phase of the harmonic currents, and the conditions of the fundamental current detected by the acquiring section. The correlation relationship has been determined in advance.

According to the present invention, because the correlation relationship between the conditions of the fundamental current and the amplitude and phase of the harmonic currents to be superimposed over the fundamental current have been determined in advance, the harmonic current calculation section calculates the amplitude and phase of the harmonic currents to be superimposed over the fundamental current on the basis of the correlation relationship and the detected conditions of the fundamental current. That is, the harmonic current calculation section calculates the harmonic currents corresponding to the correct conditions of the fundamental current.

Accordingly, even if the conditions of the fundamental current are changed due to the variation of the load of the rotating electric machine, the harmonic current calculation section superimposes the harmonic currents corresponding correctly to the change of the load of the rotating electric machine over the fundamental current. Even if the change of the conditions of the fundamental current occurs, it is possible to reduce electromagnetic force components causing noise.

In addition, there is a possible case that the load of the rotating electric machine is changed due to the conditions of the instruction values to be supplied to the rotating electric machine. There is a risk that it is difficult to effectively reduce electromagnetic force causing noise even if the harmonic currents before the change of the instruction values for the rotating electric machine are superimposed over the fundamental current.

On the other hand, the harmonic current calculation section in the control device calculates the amplitude and phase of the harmonic currents to be superimposed over the fundamental current on the basis of the conditions of the fundamental current relating to the change of load of the rotating electric machine.

In accordance with another aspect of the present invention, there is provided the control device which further has a judgment section. The judgment section judges the conditions of instruction values generated by the control device. The conditions of the instruction values affect the load of the rotating electric machine. The harmonic current calculation section calculates the amplitude and phase of the harmonic currents to be superimposed over the fundamental current on the basis of the correlation relationship between the amplitude and phase of the harmonic currents, and the conditions of the fundamental current judged by the judgment section. The correlation relationship has been determined in advance.

According to the present invention, the correlation relationship between the conditions of the instruction values affecting a magnitude of load of the rotating electric machine and the amplitude and phase of the harmonic currents to be superimposed over the fundamental current have been determined. The harmonic current calculation section calculates the amplitude and phase of the harmonic currents to be superimposed over the fundamental current on the basis of the correlation relationship and the conditions of the instruction values. That is, the harmonic current calculation section calculates the harmonic currents corresponding to the conditions of the instruction values which affect a magnitude of the load of the rotating electric machine. Accordingly, even if the load of the rotating electric machine varies due to the change of the instruction values, the harmonic current calculation section superimposes the harmonic currents corresponding correctly to the change of the load of the rotating electric machine over the fundamental current. Even if the conditions of the instruction values affecting the magnitude of load of the rotating electric machine are changed, it is possible to reduce electromagnetic force components causing noise.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
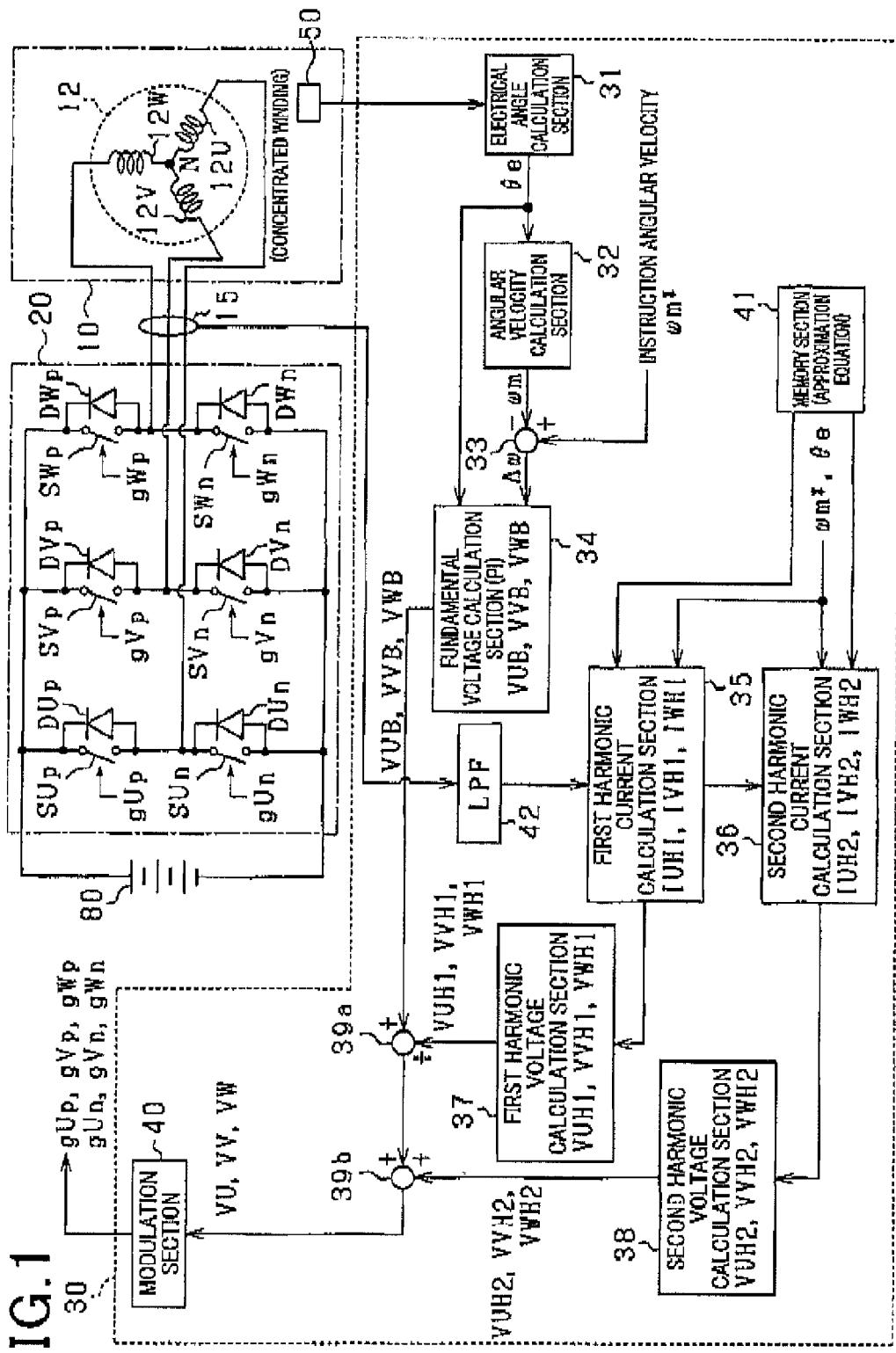
FIG. 1 is a view showing a schematic structure of a motor system having a control device according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

A description will be given of a control device applied to a blower motor as a rotating electric machine in an automobile air conditioning system (in-vehicle A/C system) mounted on a vehicle.

First Exemplary Embodiment

A description will be given of the control device 30 for a rotating electric machine according to the first exemplary embodiment with reference to FIG. 1 to FIG. 7.

FIG. 1 is a view showing a schematic structure of a rotating electric machine system (or the motor system) having the control device 30 according to the first exemplary embodiment. The motor system shown in FIG. 1 is the in-vehicle A/C system. The in-vehicle A/C system has the control device 30, the blower motor 10 (hereinafter, the motor 10) as a rotating electric machine, an inverter 20, a current sensor 15 and a rotation angle sensor 50.

The motor 10 is a permanent magnet synchronous motor of three phase concentrated windings (hereinafter, three phase windings). The inverter 20 receives and converts a direct current electric power (DC electric power) supplied from a battery 80 as a direct current power source to an alternating current electric power (AC electric power). The motor 10 rotates when receiving the AC electric power supplied from the inverter 20.

Figure 2:
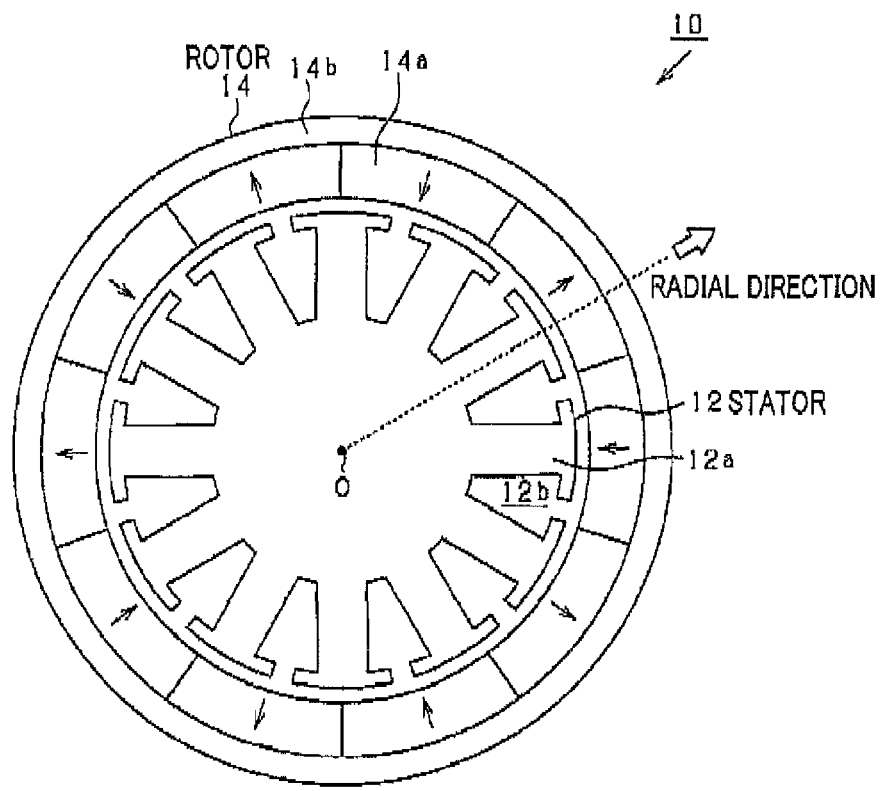
FIG. 2 is a schematic view showing a vertical cross section of the rotating electric machine shown in FIG. 1.

FIG. 2 is a schematic view showing a vertical cross section of the motor 10 shown in FIG. 1. The vertical cross section shown in FIG. 2 is perpendicular to a rotary shaft of the motor 10. The rotary shaft of the motor 10 passes through a central point O shown in FIG. 2. As shown in FIG. 2, the motor 10 is composed of a stator 12 and a rotor 14 having a circular shape, etc. In the motor 10, the number $P_{pole\text{-}pair}$ of pole pairs is 5 ($P_{pole\text{-}pair}$=5) and the number of slots is 12 (S=12).

The rotor 14 is arranged at the outside of the stator 12 through a gap. That is, the gap is formed in a radial direction of the motor 10 between the rotor 14 and the stator 12. The rotor 14 has a plurality of permanent magnets 14a and a back yoke 14b made of soft magnetic material. The permanent magnets 14a are arranged along a circumferential direction of the rotor 14. The permanent magnets 14a are linked together by the back yoke 14b. The number of the permanent magnets 14a in the rotor 14 is ten. Each of the permanent magnets 14a has the same shape and forms a magnet pole.

The permanent magnets 14a are magnetized in the radial direction of the rotor 14. The permanent magnets 14a arranged adjacently to each other have alternating magnet poles. That is, the permanent magnets 14a arranged along the circumferential direction of the rotor 14 have a different magnetic pole alternately. In more detail, the S pole permanent magnets 14a and the N pole permanent magnets 14a are alternately arranged along the circumferential direction. The arrow mark shown in FIG. 2 indicates the direction from the S pole to the N pole.

The stator 12 has twelve teeth 12a and twelve slots 12b. Each of the twelve teeth 12a has the same width, and each of the twelve slots 12b has the same width. The twelve teeth 12a and the twelve slots 12b are alternately arranged along the circumferential direction of the stator 12. That is, the twelve teeth 12a are arranged at same intervals along the circumferential direction of the stator 12. Three phase windings 12U, 12V and 12W are wounded in the twelve teeth 12a of the stator 12.

The inverter 20 (i.e. an electric power conversion device) is a three phase inverter having three connection units. A first connection unit is composed of a pair of an upper arm switching element SUp and a lower arm switching element SUn connected in series. A second connection unit is composed of a pair of an upper arm switching element SVp and a lower arm switching element SVn connected in series. A third connection unit is composed of a pair of an upper arm switching element SWp and a lower arm switching element SWn connected in series. The first to third connection units are connected parallel to the battery 80. A connection node between the upper arm switching element SUp and the lower arm switching element SUn is connected to a first terminal of the phase winding 12U of the stator 12. A connection node between the upper arm switching element SVp and the lower arm switching element SVn is connected to a first terminal of the phase winding 12V of the stator 12. A connection node between the upper arm switching element SWp and the lower arm switching element SWn is connected to a first terminal of the phase winding 12W of the stator 12. A second terminal of the phase winding 12U, a second terminal of the phase winding 12V and a second terminal of the phase winding 12W are connected to a neutral point N shown in FIG. 1.

The control device 30 is composed of a microcomputer, a memory unit 41, etc. The microcomputer has a central processing unit (CPU), a read only memory (ROM), a random access memory (RAM), an input/output (I/O) interface, etc. The control device 30 controls the operation of the inverter 20 so that the control values of the motor 10 are adjusted to instruction values. The control device 30 according to the first exemplary embodiment uses a rotation angular velocity as the control value. The control device 30 receives detection signals transmitted from a rotation angle sensor 50 such as a revolver. Each of the detection signals transmitted from the rotation angle sensor 50 corresponds to a magnetic point of the rotor 14 in the motor 10.

The CPU in the control device 30 performs one or more control programs stored in the ROM so as to execute following functions capable of adjusting the rotation angular velocity as the control value to an instruction angular velocity ωm*. The CPU in the control device 30 executes the functions of an electrical angle calculation unit 31, an angular velocity calculation unit 32, a deviation calculation section 33, a fundamental voltage calculation section 34, a first harmonic current calculation section 35, a second harmonic current calculation section 36, a first harmonic voltage calculation section 37, a second harmonic voltage calculation section 38, a first superimposing section 39a, a second superimposing section 39b, a low pass filter (LPF) 42, and a modulation section 40.

The electrical angle calculation unit 31 calculates an electrical angle θe which represents a rotation angle of the motor 10 on the basis of the detection signal transmitted from the rotation angle sensor 50.

The angular velocity calculation unit 32 performs a time differential of the electrical angle θe calculated by the electrical angle calculation unit 31, and calculates a rotation angular velocity ωm of the motor 10. The rotation angular velocity ωm represents a mechanical angular velocity.

The deviation calculation section 33 calculates a velocity deviation Δw by subtracting an actual rotation angular velocity ωm of the motor 10 calculated by the angular velocity calculation unit 32 from the instruction angular velocity ωm*

An external device (not shown) transmits the instruction angular velocity ωm* to the control device 30. The external device is arranged higher in a hierarchy structure than the control device 30. In more detail, when the driver of a vehicle adjusts an air flow amount of the in-vehicle A/C system mounted on the vehicle, the external device (not shown) generates and transmits the instruction angular velocity ωm* corresponding to the air flow amount selected by the driver of the vehicle to the control device 30.

The fundamental voltage calculation section 34 calculates fundamental voltages VUB, VVB, and VWB of the U phase, V phase and W phase, respectively in a three phase high and low coordinate system expressed by the equation (1). The calculated fundamental voltages VUB, VVB, and VWB are the control values to be used for performing a feedback control of the rotation angular velocity ωm to the instruction angular velocity ωm* on the basis of the velocity deviation Δw, the electrical angle θe and the rotation angular velocity ωm.

In more detail, the fundamental voltage calculation section 34 performs a proportional integral derivative control (PI control) of the velocity deviation Δw so as to calculate the fundamental voltages VUB, VVB, and VWB of the U phase, V phase and W phase during a period of the electric angular. The IP control uses an electrical angular velocity ωθ to calculate a variable angular velocity of each of the fundamental voltages VUB, VVB, and VWB.

It is sufficient for the fundamental voltage calculation section 34 to calculate the electrical angular velocity ωθ by multiplying the received rotation angular velocity ωm and the number $P_{pole\text{-}pair}$ of the pole pairs of the motor 10. The fundamental voltage calculation section 34 outputs each of the calculated fundamental voltages VUB, VVB, and VWB corresponding to the electrical angular θe. Each of the fundamental voltages VUB, VVB, and VWB has the same waveform and is shifted by electrical angle 2n/3 together.

$$VUB = Va \cdot \sin(\omega_e \cdot t) \\ VVB = Va \cdot \left(\omega_e \cdot t + \frac{2}{3}\pi\right) \\ VWB = Va \cdot \sin\left(\omega_e \cdot t - \frac{2}{3}\pi\right)$$ (1)

When the fundamental voltages VUB, VVB, and VWB shown in the expression (1) are applied to the phase windings 12U, 12V and 12W, respectively, the fundamental currents IUB, IVB and IWB flow in the phase windings 12U, 12V and 12W, respectively, as expressed by the following expression (2).

$$IUB = Ia \cdot \sin(\omega_e \cdot t) \\ IVB = Ia \cdot \left(\omega_e \cdot t + \frac{2}{3}\pi\right) \\ IWB = Ia \cdot \sin\left(\omega_e \cdot t - \frac{2}{3}\pi\right)$$ (2)

When the fundamental current flows in the phase windings 12U, 12V and 12W of the stator 12 of the motor 10, and a rotation magnet field is generated, the electromagnetic force is generated, and the generated electromagnetic force is applied in the radial direction to the rotor 14. The generated electromagnetic force varies along the circumferential direction of the rotor 14. The rotor 14 is attracted toward the stator 12 by the generated electromagnetic force, and the rotor 14 is also repulsed by the generated electromagnetic force. That is, the generated electromagnetic force acts as attraction force and a repulsive force. Because the rotor 14 is an elastic member, the rotor 14 vibrates by the generated electromagnetic force as vibration force. When the generated electromagnetic force has a frequency which is equal to the resonance frequency of the circular mode, there is a possible increasing of noise, i.e. magnetic noise of the motor 10. A description will now be given of the circular mode.

The circular mode indicates a periodic fluctuation generated in the rotor 14 by the vibration force applied in the radial direction to the rotor 14.

Figure 3:
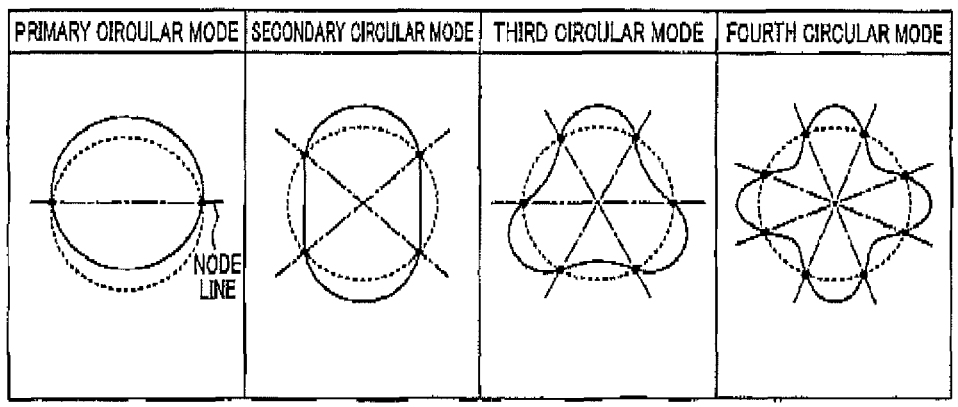
FIG. 3 is a view explaining first to fourth circular modes of the rotating electric machine shown in FIG. 1 and FIG. 2.

FIG. 3 is a view explaining first to fourth circular modes of the rotor 14 in the motor 10 as the rotating electric machine shown in FIG. 1 and FIG. 2. FIG. 3 is a schematic view of a vertical cross section of the rotor 14 in the motor 10. As shown in FIG. 3, the dotted lines represent the rotor 14 (the original shape of the rotor 14) to which no excitation force is applied. On the other hand, the solid lines indicate the rotor 14 to which the excitation force is applied. Further, the long and short dash lines indicate node lines, each of which connects two nodes. The nodes are separated by n when vibration force is applied to the rotor 14 and the rotor 14 is deformed. An intermediate point between the adjacent nodes becomes an antinode of the deformation. Even if vibration force is applied to the node, no deformation occurs at each node of the rotor 14.

In the primary circular mode at the left side in FIG. 3, the rotor 14 is deformed around one node line while the rotor 14 is rotating. In the primary circular mode, one belly is expanded toward the radial direction the rotor 14, and another belly separated from the expanded belly by n is shrunk toward the radial direction of the rotor 14.

In the secondary circular mode, the rotor 14 is deformed around two node lines while the rotor 14 is rotating. In the secondary circular mode, two bellies are expanded toward the radial direction the rotor 14, and two antinodes separated from the expanded bellies by n/2 are shrunk toward the radial direction of the rotor 14.

In the third circular mode, the rotor 14 is deformed around three node lines while the rotor 14 is rotating. In the third circular mode, three bellies are expanded toward the radial direction of the rotor 14, and the three bellies separated from the expanded bellies by n/2 are shrunk toward the radial direction of the rotor 14.

In the fourth circular mode, the rotor 14 is deformed around four node lines while the rotor 14 is rotating. In the fourth circular mode, four bellies are expanded toward the radial direction the rotor 14, and four bellies separated from the expanded four by n/2 are shrunk toward the radial direction of the rotor 14.

The vibration force generating a next circular mode has the angle interval n/X between a position at which the attraction force is increased and a position at which the attraction force is reduced (X is a natural number).

Each of these circular modes shown in FIG. 3 has a natural resonance frequency (resonance angular velocity). A resonance phenomenon occurs in the rotor 14 when the frequency of the vibration force to generate each circular mode becomes close to the resonance frequency of each circular mode. That is, when an actual frequency of the vibration force becomes close to the resonance frequency of each circular mode of the rotor 14, the magnetic noise generated in the motor 10 increases, and a noise level near the audible frequency range becomes large. For this reason, it is desirable to reduce this effect, i.e. there is a strong demand to reduce the magnitude of electromagnetic force having a frequency which is close to the resonance frequency of each circular mode of the rotor 14.

In general, for example, as described in the patent document 1 previously described, because 6M-th electromagnetic force component (node force) at the 6M-th torque ripple (M is a positive integer) in a synchronous motor generates a large amount of noise, it is desired and necessary to reduce the 6M-th electromagnetic force component. In synchronous motors, it is known that a main component of electromagnetic force is even-th electromagnetic force component.

That is, because the electromagnetic force, a frequency of which is close to the resonance frequency of each circular mode of the rotor 14, and the 6M-th electromagnetic force component generates large part of magnetic noise, it is effective to reduce these electromagnetic force. In the exemplary embodiments according to the present invention, the motor 10 is used as the motor 10 in the in-vehicle A/C system and arranged in the compartment on the vehicle. For this reason, in order to ao provide comfortable compartment environment to the driver and occupants of the vehicle, it is necessary to reduce electromagnetic force which causes magnetic noise when the motor 10 rotates. In the following explanation, a K-th angular velocity K is K times a variable angular velocity of each of the fundamental currents IUB, IVB and IWB, and a K-th electromagnetic force component has the K-th angular velocity, where K is an integer of not less than 2.

In particular, the conventional control device disclosed by the patent document 1 previously described superimposes the (6M−1)-th or (6M+1)-th harmonic current over the fundamental current in order to reduce the 6M-th electromagnetic force component.

A description will now be given of the method of reducing the 6M-th electromagnetic force component by superimposing the (6M−1)-th harmonic current over the fundamental current in order to reduce the 6M-th electromagnetic force component. The following equations (3) represent a β-th harmonic current.

$$IH = e \cdot \cos(\beta \cdot \omega_e \cdot t) + f \cdot \sin(\beta \cdot \omega_e \cdot t) \quad (3)$$

where when β=6M−1, the harmonic electromagnetic force FT can be expressed by using the following equation (4).

$$FH = \left(\frac{a_i \cdot e - b_1 \cdot f}{2}\right) \cos((6M \cdot \omega e \cdot t) + \quad (4)$$
$$\left(\frac{a_1 \cdot e + b_1 \cdot f}{2}\right) \cos((6M-2)\omega e \cdot t) + \left(\frac{a_1 \cdot f + b_1 \cdot e}{2}\right)$$
$$\sin((6M \cdot \omega e \cdot t) + \left(\frac{b_1 \cdot e - a_1 \cdot f}{2}\right) \sin((6M-2)\omega e \cdot t)$$

The equation (4) shows the 6M-th electromagnetic force component and the (6M−2)-th electromagnetic force component are applied to the rotor 14 when the (6M−1)-th harmonic current flows in the three phase windings 12U, 12V and 12W of the stator 12. That is, it is possible for the control device 30 according to the first exemplary embodiment to adjust the (6M−2)-th electromagnetic force component by adjusting a coefficient e and a coefficient f of the (6M−1)-th harmonic current.

On the other hand, the conventional control device disclosed in the patent document 1 adjusts the coefficient e and the coefficient f to reduce the 6M-th electromagnetic force component.

However, when the 6M-th electromagnetic force component is reduced, the (6M−2)-th electromagnetic force component increases. That is, the 6M-th electromagnetic force component is converted to the (6M−2)-th electromagnetic force component. For this reason, when the (6M−2)-th electromagnetic force component has a frequency close to the resonance frequency of the circular mode, there is a possible increase of noise in the motor 10.

On the other hand, in a case in which the (6M−2)-th electromagnetic force component has a frequency close to the resonance frequency of the circular mode, when the (6M−2)-th electromagnetic force component is reduced by adjusting the coefficients e and f, the 6M-th electromagnetic force component increases. That is, the (6M−2)-th electromagnetic force component is converted to the 6M-th electromagnetic force component. The term "6M-th" indicates the order of the torque ripple, and there is a possible case in which the 6M-th electromagnetic force component has a frequency which is adequately separated from the resonance frequency. Accordingly, in order to reduce both the (6M−2)-th electromagnetic force component and the 6M-th electromagnetic force component, it can be considered to convert the (6M−2)-th electromagnetic force component to the 6M-th electromagnetic force component, and the 6M-th electromagnetic force component is converted to another order electromagnetic force component.

The (6M−2)-th electromagnetic force component and the 6M-th electromagnetic force component are applied to the rotor 14 by supplying the (6M−1)-th harmonic current to the three phase windings 12U, 12V and 12W of the stator 12.

Similar to this, the 6M-th electromagnetic force component and the (6M+2)-th electromagnetic force component are applied to the rotor 14 by supplying the (6M+1)-th harmonic current to the three phase windings 12U, 12V and 12W of the stator 12. That is, it is possible for the control device 30 to adjust the coefficient e and the coefficient f of the (6M+1)-th harmonic current so as to adjust the 6M-th electromagnetic force component and the (6M+2)-th electromagnetic force component.

Accordingly, it is possible to convert the (6M−2)-th electromagnetic force component to the 6M-th electromagnetic force component by supplying the (6M−1)-th harmonic current to the motor 10. It is further possible to convert the 6M-th electromagnetic force component to the (6M+2)-th electromagnetic force component by supplying the (6M+1)-th harmonic current to the motor 10.

That is, this control makes it possible to reduce the (6M−2)-th electromagnetic force component and the 6M-th electromagnetic force component. Still further, when an odd numbered harmonic current of order not less than (6M+3) is supplied to the rotor 10, it is possible to reduce the even-th order electromagnetic force component of not less than the (6M+4)-th order.

As previously described in detail, it is possible for the control device 30 to reduce the even-th electromagnetic force component within a predetermined range by superimposing plural harmonic currents of an odd number order over the fundamental current. In more detail, when the predetermined order range is from the order L-th (where L is an even number of not less than 2) to the (N−2)-th order, where N is larger than L and is different from L, and an even number is not less than 2.

It is sufficient to superimpose the continuous odd number order harmonic currents over the fundamental current. This makes it possible to sequentially convert the electromagnetic force from the order of L-th to the order of (N−2)-th to the N-th electromagnetic force. It is therefore possible for the control device 30 to reduce the L-th to (N−2)-th electromagnetic force components.

Figure 4:
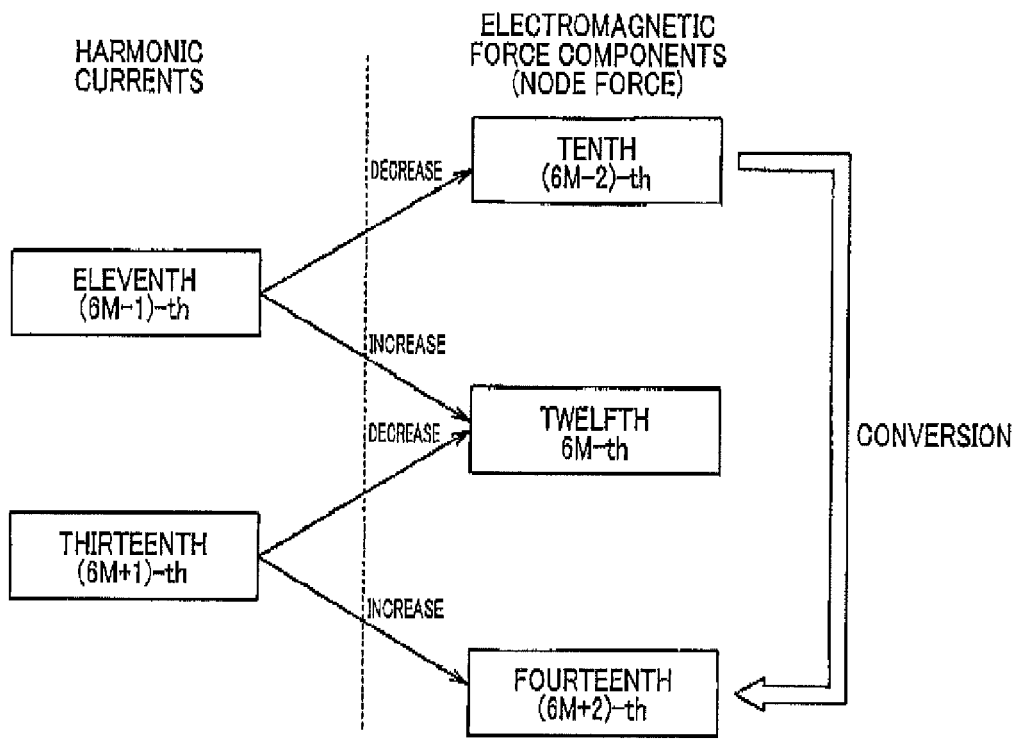
FIG. 4 is a view showing a method of converting tenth electromagnetic force component to fourteenth electromagnetic force component.

FIG. 4 is a view showing a method of converting tenth electromagnetic force component to fourteenth electromagnetic force component.

As shown in FIG. 4, the control device 30 according to the first exemplary embodiment determines that the (6M−2)-th electromagnetic force component has the frequency which is close to the resonance frequency of the circular mode. In order to reduce the (6M−2)-th electromagnetic force component and the 6M-th electromagnetic force component, the control device 30 superimposes the (6M−1)-th harmonic current and the 6M-th harmonic current over the fundamental current.

The first exemplary embodiment explains that M=2, and the eleventh, i.e. (6M−1)-th harmonic current is the first harmonic currents IUH1, IVH1 and IWH1, and the thirteenth, i.e. (6M+1)-th harmonic current is the second harmonic currents IUH2, IVH2 and IWH2.

The control device 30 according to the first exemplary embodiment reduces the tenth and eleventh electromagnetic force component, and superimposes the eleventh and thirteenth harmonic current over the fundamental current, and the tenth and eleventh electromagnetic force component to the fourteenth electromagnetic force component. The first exemplary embodiment uses various order numbers when the number of the pole pairs is 1 ($P_{pole-pair}=1$). Actually, when the number $P_{pole-pair}$ of the pole pairs is 5 ($P_{pole-pair}=5$), the order number becomes 5 times the order number when the number of the pole pairs is 1 ($P_{pole-pair}=1$).

When the instruction angular velocity $\omega m^*$ has the same value, but the load of the motor 10 varies, the conditions of the fundamental current also vary. Here, the conditions of the fundamental current are the amplitude and phase.

For example, the load of the motor 10 varies when the driver of the vehicle switches the air flow mode of the in-vehicle A/C system. In general, there are air outlet sections of the in-vehicle A/C system arranged at the instrument panel section of the vehicle, an occupant's leg section of a rear seat, etc. in the compartment of the vehicle. The air flow mode includes a face blowing mode, a foot blowing mode, etc. For example, in the face blowing mode, the in-vehicle A/C system supplies cooling air or warm air into the inside of the compartment of the vehicle through the air outlet section arranged in the instrument panel. In the foot blowing mode, the in-vehicle A/C system supplies cooling air or warm air through the air outlet section arranged in the rear seat near the occupant's leg position.

A volume of the air flow passage varies due to the air flow mode of the in-vehicle A/C system, where the volume of the air flow passage is measured in the air flow passage from the location of the motor 10 to the location of air outlet section. This changes an air flow resistance in the air flow passage. Accordingly, the switching of the air flow mode causes the change of the load of the motor 10. Even if, the instruction angular velocity $\omega m^*$ does not change, the condition of the fundamental current is changed. Further, because various types of vehicles has a different volume of the air flow passage measured from the location of the motor 10 to the location of air outlet section. Accordingly, the condition of the fundamental current is changed due to the types of the vehicles when the instruction angular velocity $\omega m^*$ has the same value, i.e. is not changed in the various types of the vehicles.

The harmonic currents calculated by using the equation (3) and the equation (4) are to be superimposed over the fundamental current, respectively when the conditions of the fundamental current are used as the predetermined conditions. When the predetermined conditions of the fundamental current are changed, the harmonic currents to be superimposed are also changed. For this reason, there is a risk that it is difficult to effectively reduce electromagnetic force components within a predetermined suppression range even if the (6M−1)-th harmonic current having the amplitude and phase corresponding to the fundamental current is superimposed over the fundamental current whose conditions have been changed.

Accordingly, in order to avoid this problem, it is necessary to determine a correct amplitude and phase for a harmonic current to be superimposed over the fundamental current on the basis of the conditions of the fundamental current which flows in the motor 10.

In order to solve such a drawback, it is considered to provide a method for preparing harmonic current maps relating to harmonic currents every air flow modes of the in-vehicle A/C system. In the method, each of the harmonic currents is superimposed over the fundamental current. The method stores the prepared harmonic current maps in the memory unit 41.

However, because the method requires a large amount of memory for storing the overall harmonic current maps, it is difficult to use a cheap microcomputer of a small memory size which is easily available on the commercial market.

Further, even if an expensive memory unit of a large amount of memory size is replaced with the cheap memory unit of a small memory size, this increases its manufacturing cost. Still further, when the harmonic current maps are prepared every air flow mode of the in-vehicle A/C system, it is required to prepare them for every type of vehicle. These methods involve a drawback of increasing the number of manufacturing steps and the manufacturing cost.

In order to solve the drawbacks previously described, the first exemplary embodiment uses a method of determining a relationship (correlation relationship) between the conditions of the fundamental current flowing the motor 10 and an amplitude and phase of harmonic currents to be superimposed over the fundamental current, and further obtaining an amplitude of the fundamental current flowing in the motor 10.

Since the control device 30 according to the first exemplary embodiment adjusts the fundamental current of three phases to be equilibrium to each other, the phase of the fundamental current does not vary. Accordingly, the control device 30 according to the first exemplary embodiment uses the amplitude only as the condition of the fundamental current flowing in the motor 10.

The control device 30 according to the first exemplary embodiment determines the amplitude and phase of each harmonic current to be superimposed over the fundamental current, on the basis of the relationship and the amplitude of the fundamental current which have been prepared.

A description will now be given of the method performed by the control device 30 according to the first exemplary embodiment which superimposes the primary harmonic currents IHU1, IVH1 and IWH1 and the secondary harmonic currents IHU2, IVH2 and IWH2 over the fundamental currents IUB, IVB and IWB, respectively.

Figure 5:
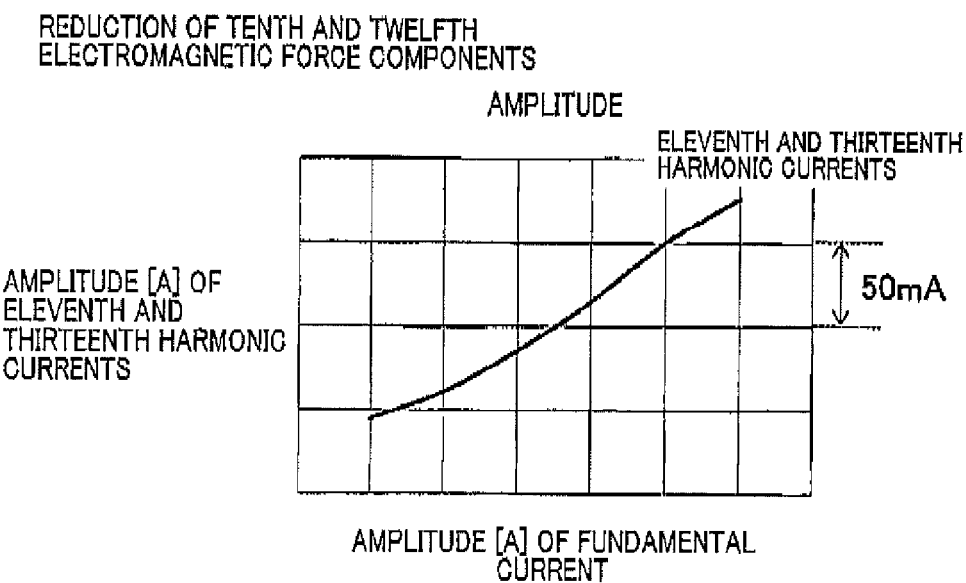
FIG. 5 is a view showing a relationship in amplitude between the fundamental current, an eleventh harmonic current and a thirteenth harmonic current when the tenth electromagnetic force component and twelfth electromagnetic force component are reduced.
Figure 6:
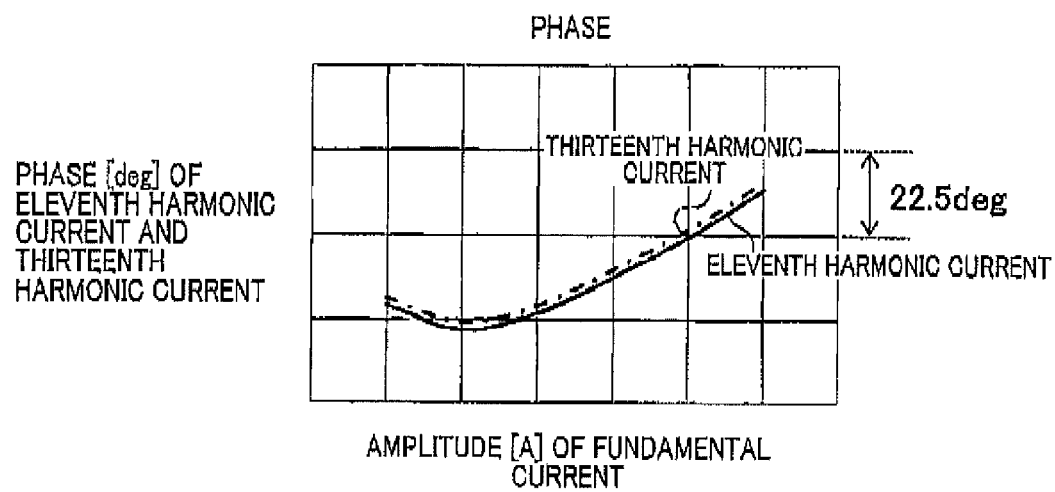
FIG. 6 is a view showing a relationship in phase between the fundamental current, the eleventh harmonic current and the thirteenth harmonic current when the tenth electromagnetic force component and the twelfth electromagnetic force component are reduced.

FIG. 5 is a view showing a relationship in amplitude between the fundamental current, the eleventh harmonic current and the thirteenth harmonic current when the tenth electromagnetic force component and twelfth electromagnetic force component are reduced. FIG. 6 is a view showing a relationship in phase between the fundamental current, the eleventh harmonic current and the thirteenth harmonic current when the tenth electromagnetic force component and the twelfth electromagnetic force component are reduced.

In the control device 30 according to the first exemplary embodiment, the first harmonic current calculation section 35 calculates the primary harmonic currents IHU1, IVH1 and IWH1 of the eleventh order. The second harmonic current calculation section 36 calculates the secondary harmonic currents IHU2, IVH2 and IWH2 of the thirteenth order.

As shown in FIG. 5, there is the relationship between the amplitude Ia of the fundamental current, the amplitude I11 of the eleventh harmonic current and the amplitude I13 of the thirteenth harmonic current.

Further, as shown in FIG. 6, there is the relationship between the amplitude Ia of the fundamental current, the phase $\beta 11$ of the eleventh harmonic current and the phase $\beta 13$ of the thirteenth harmonic current.

That is, there is the tendency in which the amplitude I11 of the eleventh harmonic current is equal to the phase I13 of the thirteenth harmonic current, and the more the amplitude Ia of the fundamental current becomes high, the more the amplitude I11 of the eleventh harmonic current and the amplitude I13 of the thirteenth harmonic current become high.

Furthermore, the phase $\beta 11$ of the eleventh harmonic current and the phase $\beta 13$ of the thirteenth harmonic current have the same change due to the change of the amplitude Ia of the fundamental current. On the other hand, the phase $\beta 13$ of the thirteenth harmonic current has a large positive offset to increase when compared with the phase $\beta 11$ of the eleventh harmonic current.

The control device 30 according to the first exemplary embodiment uses the eleventh harmonic current as the main harmonic current. The control device 30 generates in advance a main approximation equation which represents a relationship between the amplitude Ia of the fundamental current and each of the amplitude I11 and the phase $\beta 11$ of the eleventh harmonic current. The control device 30 stores in advance the main approximation equation into the memory unit 41.

Furthermore, the control device 30 generates in advance a sub-approximation equation which represents a relationship between the amplitude I11 of the eleventh harmonic current and the amplitude I13 of the thirteenth harmonic current, and another sub-approximation equation which represents a relationship between the phase $\beta 11$ of the eleventh harmonic current and the phase $\beta 13$ of the thirteenth harmonic current. The control device 30 stores in advance these sub-approximation equations into the memory unit 41.

The main approximation equation can be expressed by using the following equations (5) and (6). The sub approximation equations can be expressed by using the following equations (7) and (8).

The control device 30 according to the first exemplary embodiment has stored the approximation equations (5) to (8) associated with the instruction angular velocity $\omega m^*$ into the memory unit 41.

The term Ib11 in the equation (5) indicates the amplitude of the eleventh harmonic current to be superimposed over the fundamental current at the reference point as a predetermined operation point of the motor 10. The term Ib11 in the equation (5) can be calculated in advance on the basis of the equation (4). The term $\Delta$Ia in the equation (5) indicates a difference between amplitude of the fundamental current and amplitude of the reference fundamental current. The term K50 in the equation (5) indicates a compensation coefficient. The term K50·$\Delta$Ia in the equation (5) indicates a correct term to the reference harmonic current. A, B and C in the equation (5) are phase approximation coefficients, and $\alpha$ is a phase compensation term.

$$J11 = Ib11 + (K50 \cdot \Delta Ia) \tag{5}$$

$$\beta 11 = A \cdot Ia^2 + B \cdot Ia + C \tag{6}$$

$$I13 = I11 \tag{7}$$

$$\beta 13 = \beta 11 + \alpha \tag{8}$$

The first harmonic current calculation section 35 calculates the amplitude I11 and the phase $\beta 11$ of the eleventh harmonic current on the basis of the approximation equations (5) and (6) which correspond to the amplitude Ia of the fundamental current flowing in the motor 10 and the instruction angular velocity $\omega m^*$.

The current sensor 15 detects a drive current flowing in the motor 10. The LPF 42 receives the detected drive current transmitted from the current sensor 15. The first harmonic current calculation section 35 calculates the fundamental current flowing in the motor 10 on the basis of the current value transmitted from the LPF 42.

The second harmonic current calculation section 36 calculates the amplitude I13 and the phase $\beta 13$ of the thirteenth harmonic current on the basis of the amplitude I11 and the phase $\beta 11$ of the eleventh harmonic current calculated by the first harmonic current calculation section 35 by using the approximation equations (7) and (8) corresponding to the instruction angular velocity $\omega m^*$.

The first harmonic current calculation section 35 and the second harmonic current calculation section 36 correspond to a harmonic current calculation section. The memory unit 41 corresponds to a memory section. The LPF 42 corresponds to a current value acquirement section.

It is acceptable to use the thirteenth harmonic current as the main harmonic current (the first harmonic current), and the approximation equations (5) and (6) as the main approximation equations showing the relationship between each of the amplitude I13 and the phase $\beta 13$ of the thirteenth harmonic current and the amplitude Ia of the fundamental current.

The first harmonic voltage calculation section 37 converts the first harmonic currents IUH1, IVH1 and IWH1 to the first harmonic voltages VUH1, VVH1 and VWH1, respectively. Similarly, the second harmonic voltage calculation section 38 converts the second harmonic currents IUH2, IVH2 and IWH2 to the second harmonic voltages VUH2, VVH2 and VWH2, respectively.

The first superimposing section 39a adds the first harmonic voltages VUH1, VVH1 and VWH1 calculated by the first harmonic voltage calculation section 37 to the fundamental voltages VUB, VVB, and VWB of the U phase, V phase and W phase, respectively calculated by the fundamental voltage calculation section 34.

The second superimposing section 39b adds the second harmonic voltages VUH2, VVH2 and VWH2 calculated by the second harmonic voltage calculation section 38 to the output voltages VUB+VUH1, VVB+VVH1 and VWB+VWH1 of the first superimposing section 39a, respectively.

The output voltages VUB+VUH1+VUH2, VVB+VVH1+VVH2 and VWB+VWH1+VWH2 of the second superimposing section 39b correspond to the instruction voltages VU, VV and VW to be supplied to the phase windings 12U, 12V and 12W, respectively.

When the instruction voltages VU, VV and VW are supplied to the phase windings 12U, 12V and 12W, respectively, the drive currents are IU, IV and IW in the phase windings 12U, 12V and 12W, respectively. In the drive currents IU, IV and IW, the harmonic current has been superimposed over the fundamental current.

The drive currents IU, IV and IW correspond to the output currents IUB+IUH1+IUH2, IVB+IVH1+IVH2 and IWB+IWH1+IWH2, respectively.

Figure 7:
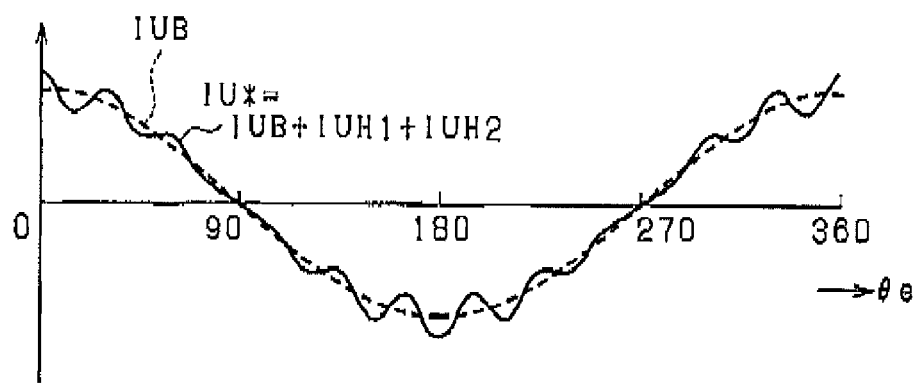
FIG. 7 is a view showing a drive current IU of a U phase to be supplied to a phase winding U of a stator in a motor.

FIG. 7 is a view showing the drive current IU to be supplied to the phase winding of the U phase of the stator 12 in the motor 10.

Each of the drive current IV and the drive current IW has the same shape in waveform as the drive current IU, and is shifted in phase of the electrical angle by $\frac{2}{3}$ n, respectively. The drive current IV is supplied to the phase winding of the V phase, and the drive current IW is supplied to the phase winding of the W phase.

The modulation section 40 generates operation signals gUp and gUn, operation signals gVp and gVn, and operation signals gWp and gWn. The operation signals gUp and gUn are used for making the output voltage of the U phase in the inverter 20 approach to the instruction voltage VU. The operation signals gVp and gVn are used for making the output voltage of the V phase in the inverter 20 approach to the instruction voltage VV. The operation signals gWp and gWn are used for making the output voltage of the W phase in the inverter 20 approach to the Instruction voltage VW. The modulation section 40 performs the PWM (pulse width modulation) process on the basis of the comparison of each of the instruction voltages VU, VV and VW with the carrier signals in order to generate each of these operation signals gUp, gun, gVp, gVn, gWp, gWn.

These operation signals gUp, gUn, gVp, gVn, gWp, gWn are gate signals to be supplied to the gate terminals of the switching elements SUp, SUn, SVp, SVn, SWp and SWn, respectively. The switching elements SUp, SUn, SVp, SVn, SWp and SWn are turned on/off by using the operation signals gUp, gUn, gVp, gVn, gWp, gWn, respectively.

When transmitting each of the operation signals gUp, gUn, gVp, gVn, gWp, gWn generated by the modulation section 40 to the inverter 20, each of the switching elements SUp, SUn, SVp, SVn, SWp and SWn operates on the basis of the operation signals gUp, gun, gVp, gVn, gWp, gWn, and the drive currents IU, iv and IW flow in the phase windings 12U, 12V and 12W of the stator, respectively. The modulation section 40 corresponds to the operation section.

The control device 30 according to the first exemplary embodiment previously described has the following effects.

(1) The control device 30 prepares in advance the correlation relationship between the amplitude Ip of the fundamental current, the amplitudes I11, I13, and phases β11, β13 of the harmonic currents to be superimposed over the fundamental current. The control device 30 calculates the amplitudes I11, I13 and phases β11, β13 of the harmonic currents on the basis of the amplitude Ia of the detected fundamental current which flows in the motor 10, the correlation relationship which has been obtained and stored in the memory unit 41. That is, the control device 30 calculates the harmonic currents IHU1, IVH1, IWH1, IHU2, IVH2, and IWH2 relating to the amplitude I1 of the fundamental current. Accordingly, even if the amplitude Ia of the fundamental current varies due to the variation of the load of the motor 10, the harmonic currents IHU1, IVH1, IWH1, IHU2, IVH2, and IWH2, which correspond to the load of the motor 10, are superimposed over the fundamental currents IUB, IVB, and IWB, respectively. This method and the control device 10 makes it possible to reduce the electromagnetic force causing noise in the motor 10 even if the amplitude Ia of the fundamental currents IUB, IVB, and IWB flowing in the phase windings 12U, 12V and 12W are changed.

(2) When the suppression range is from L-th order to (N−2)-th order which is larger than the L-th order, the control device 40 calculates harmonic currents of odd-number order in the suppression range from L-th order to N-th order by superimposing the odd-number order harmonic currents over the fundamental current, and the electromagnetic force components in the suppression range are converted to the N-th electromagnetic force component which is out of the suppression range. This makes it possible to effectively and correctly suppress the electromagnetic force in the suppression range.

(3) When the (6M−2)-th electromagnetic force component and the as 6M-th electromagnetic force component are within the suppression range, it is possible to superimpose the (6M−1)-th harmonic current and the (6M+1)-th harmonic current over the fundamental current. This makes it possible to convert the electromagnetic force within the suppression range to the (6M+2)-th electromagnetic force component.

Further, the amplitude and the phase of either the (6M−1)-th harmonic current or the (6M+1)-th harmonic current are determined on the basis of the main approximation equation which represents the correlation relationship previously described, and the amplitude and the phase of the other harmonic current are calculated on the basis of the sub-approximation equation which represents the relationship between the (6M−1)-th harmonic current and the (6M+1)-th harmonic current. Accordingly, the control device 30 effectively suppresses electromagnetic force causing noise by calculating the (6M−1)-th harmonic current and the (6M−2)-th harmonic current which correspond to the variation of the load of the motor 10 while suppressing the memory size and the calculation amount.

Further, because the control device 10 can use the same main and sub-approximation equations for various types of vehicles, this makes it possible to reduce the manufacturing cost of the control device 10.

(Modification of the First Exemplary Embodiment)

It is acceptable for the modification of the control device 30 to store in advance the maps corresponding to the main approximation equation shown in FIG. 5 and FIG. 6 instead of storing the main approximation equation into the memory unit 41. This modification makes it possible to reduce the overall memory size when compared with the first exemplary embodiment which stores in advance the map relating to the main approximation equation and the sub-approximation equations into the memory unit 41, and reduce the calculation load of the control device 30 when compared with the first exemplary embodiment which stores the main approximation equation into the memory unit 41. That is, the modification makes it possible to reduce the calculation load of the control device 30 and the used memory size in the memory unit 41.

Second Exemplary Embodiment

A description will be given of the control device 30 according to the second exemplary embodiment with reference to FIG. 8 to FIG. 10.

As previously described, the first exemplary embodiment uses the suppression range of electromagnetic force from L-th order to (N−2)-th order which is larger than L-th order, and odd numbered harmonic currents within the suppression range of L-th order to N-th order are superimposed over the fundamental current, and these order electromagnetic force components are converted to the N-th electromagnetic force component. In particular, the first exemplary embodiment uses the (6M−2)-th electromagnetic force component and the 6M-th electromagnetic force component within the suppression range, and the (6M−1)-th harmonic current and the (6M+1)-th electromagnetic force component are superimposed over the fundamental current in order to convert the electromagnetic force within the suppression range to the (6M+2)-th electromagnetic force component.

In the second exemplary embodiment, the control device 30 uses the suppression range of the electromagnetic force from L-th order to the (N+2)-th order which is lower than the L-th order, and superimposes odd numbered harmonic currents over the fundamental current.

Figure 8:
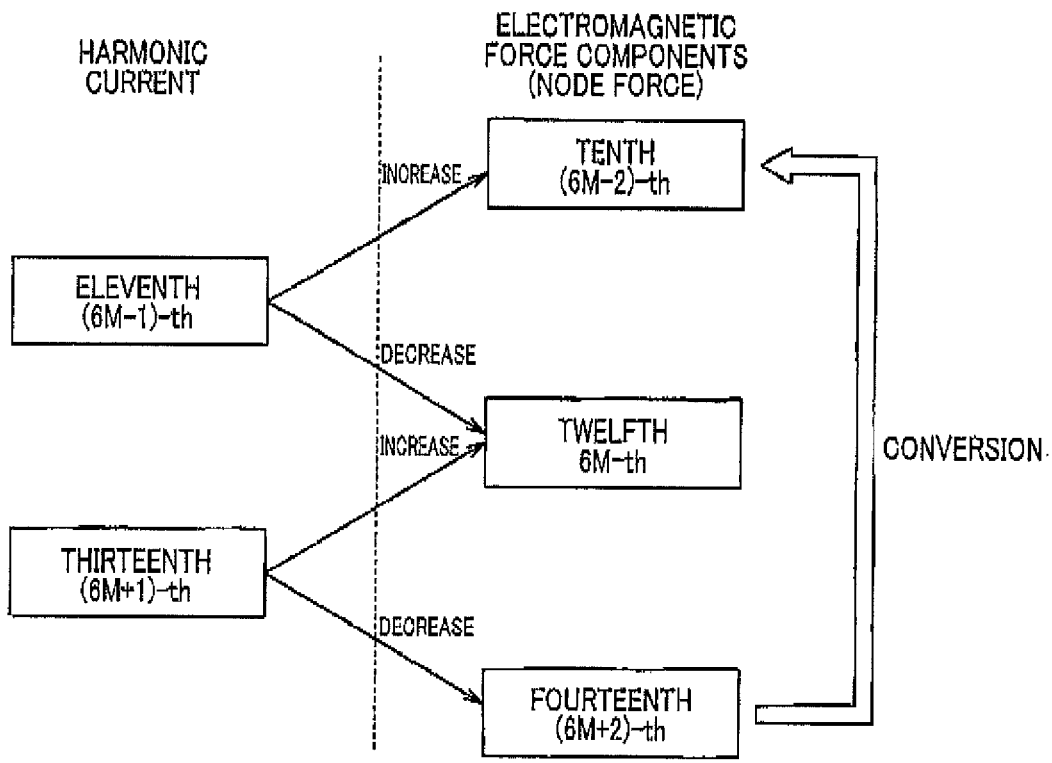
FIG. 8 is a view showing a method according to the second exemplary embodiment capable of converting the fourteenth electromagnetic force component to the tenth electromagnetic force component.

FIG. 8 is a view showing the method performed by the control device 30 according to the second exemplary embodiment capable of converting the fourteenth electromagnetic force component to the tenth electromagnetic force component. As shown in FIG. 8, the control device according to the second exemplary embodiment uses the (6M+2)-th electromagnetic force component and the (6M−1)-th electromagnetic force component which are within the suppression range, and superimposes the (6M+1)-th harmonic current and the (6M−1)-th harmonic current over the fundamental current, and converts these electromagnetic force components within the suppression range to the (6M−2)-th electromagnetic force component. The second exemplary embodiment will explain the case of M=2. That is, the control device 30 according to the second exemplary embodiment uses the thirteenth harmonic current as the first harmonic currents IUH1, IVH1 and IWH1, and the eleventh harmonic current as the second harmonic currents IHU2, IHV2 and IHW2.

In other words, the control device 30 according to the second exemplary embodiment uses the fourteenth electromagnetic force component and the eleventh electromagnetic force component within the suppression range, and superimposes the thirteenth harmonic current and the eleventh harmonic current over the fundamental current, and converts these electromagnetic force components within the suppression range to the tenth electromagnetic force component.

Figure 9:
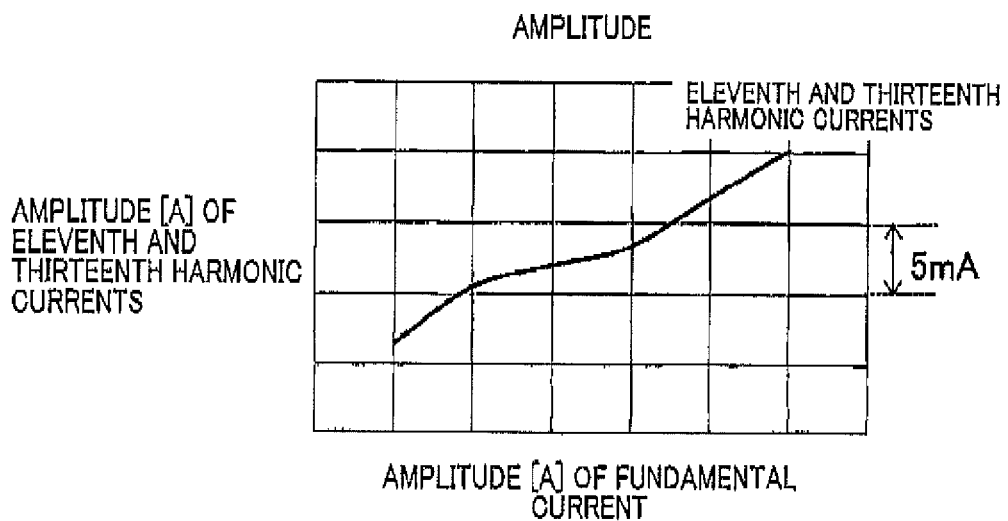
FIG. 9 is a view showing a relationship in amplitude between the fundamental current, the eleventh harmonic current and the thirteenth harmonic current when the fourteenth electromagnetic force component and the twelfth electromagnetic force component are reduced.

FIG. 9 is a view showing the relationship (correlation relationship) in amplitude between the fundamental current, the eleventh harmonic current and the thirteenth harmonic current when the fourteenth electromagnetic force component and the twelfth electromagnetic force component are reduced. FIG. 10 is a view showing the relationship (correlation relationship) in phase between the fundamental current, the eleventh harmonic current and the thirteenth harmonic current when the eleventh electromagnetic force component and the thirteenth electromagnetic force component are reduced.

In the control device 30 according to the second exemplary embodiment, the first harmonic current calculation section 35 calculates the primary harmonic currents IHU1, IVH1 and IWH1 of the thirteenth order. The second harmonic current calculation section 36 calculates the secondary harmonic currents IHU2, IVH2 and IWH2 of the eleventh order.

As shown in FIG. 9, there is the relationship (current correlation) between the amplitude Ia of the fundamental current, the amplitude I11 of the eleventh harmonic current and the amplitude I13 of the thirteenth harmonic current. Further, as shown in FIG. 10, there is the relationship (current correlation) between the amplitude Ia of the fundamental current, the phase β11 of the eleventh harmonic current and the phase β13 of the thirteenth harmonic current.

Figure 10:
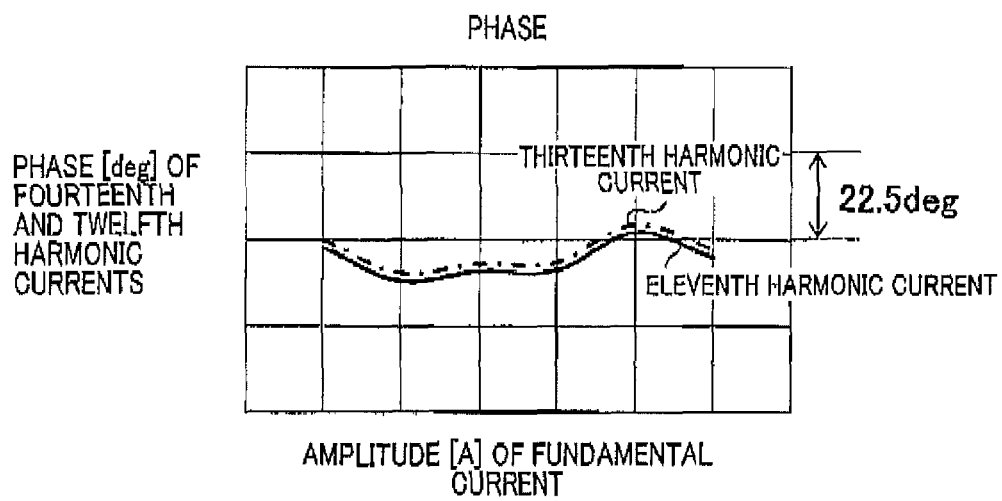
FIG. 10 is a view showing a relationship in phase between the fundamental current, the eleventh harmonic current and the thirteenth harmonic current when the fourteenth electromagnetic force component and the twelfth electromagnetic force component are reduced.

Because FIG. 9 and FIG. 10 show the converted electromagnetic force components having a different order, respectively, the maps are different from the maps shown in FIG. 5 and FIG. 6. However, the maps shown in FIG. 9 and FIG. 10 have the same tendency as the maps shown in FIG. 5 and FIG. 6.

The control device 30 according to the second exemplary embodiment uses the thirteenth harmonic current as the main harmonic current. The control device 30 generates in advance a main approximation equation which represents a relationship between the amplitude Ia of the fundamental current and each of the amplitude I13 and the phase β13 of the thirteenth harmonic current. The control device 30 stores in advance the main approximation equation into the memory unit 41.

Furthermore, the control device 30 generates in advance a sub-approximation equation which represents a relationship between the amplitude I13 of the thirteenth harmonic current and the amplitude I11 of the eleventh harmonic current, and another sub-approximation equation which represents a relationship between the phase β13 of the thirteenth harmonic current and the phase β11 of the eleventh harmonic current. The control device 30 stores in advance these sub-approximation equations into the memory unit 41.

The main approximation equation can be expressed by using the following equations (9) and (10). The sub approximation equations can be expressed by using the following equations (11) and (12). The control device 30 according to the second exemplary embodiment has stored the approximation equations (9) to (12) associated with the instruction angular velocity ωm* into the memory unit 41. In the approximation equation (9), K70 indicates a compensation coefficient.

$$I13 = Ib13 + (K70 \, \Delta Ia) \quad (9)$$

$$\beta 13 = A \cdot Ia^2 + B \cdot Ia + C \quad (10)$$

$$I11 = I \cdot I13 \quad (11)$$

$$\beta 11 = \beta 13 + \alpha \quad (12)$$

The first harmonic current calculation section 35 calculates the amplitude I13 and the phase β13 of the thirteenth harmonic current on the basis of the approximation equations (9) and (10) which correspond to the amplitude Ia of the fundamental current flowing in the motor 10 and the instruction angular velocity $\omega m^*$.

The second harmonic current calculation section 36 calculates the amplitude I11 and the phase $\beta 11$ of the eleventh harmonic current on the basis of the amplitude I13 and the phase $\beta 13$ of the thirteenth harmonic current calculated by the first harmonic current calculation section 35 by using the approximation equations (11) and (12) which correspond to the instruction angular velocity $\omega m^*$.

It is acceptable to use the eleventh harmonic current as the main harmonic current (the first harmonic current), and the approximation equations (9) and (10) as the main approximation equations showing the relationship between each of the amplitude I11 and the phase $\beta 11$ of the eleventh harmonic current and the amplitude Ia of the fundamental current.

The control device 30 according to the second exemplary embodiment has the same effect (1) as the control device 30 according to the first exemplary embodiment, and further has the following effects.

(4) When the suppression range is from L-th order to (N+2)-th order which is smaller than L-th order, the control device 40 calculates harmonic currents of odd-number order in the suppression range from L-th order to N-th order by superimposing the odd-number order harmonic currents over the fundamental current, the electromagnetic force in the suppression range is converted to the N-th electromagnetic force component which is out of the suppression range. This makes it possible to effectively and correctly suppress the electromagnetic force in the suppression range.

(5) When the (6M+2)-th electromagnetic force component and the 6M-th electromagnetic force component are in the suppression range, it is possible to superimpose the (6M−1)-th harmonic current and the (6M+1)-th harmonic current over the fundamental current. This makes it possible to convert electromagnetic force component within the suppression range to the (6M−2)-th electromagnetic force component.

Similar to the effects of the first exemplary embodiment, the control device 30 effectively suppresses electromagnetic force causing noise by calculating the (6M−1)-th harmonic current and the (6M+1)-th harmonic current which correspond to the variation of the load of the motor 10 while suppressing the memory size and the calculation amount.

(Modification of the Second Exemplary Embodiment)

Similar to the modification of the first exemplary embodiment previously described, it is acceptable for the modification of the control device 30 to store in advance the maps corresponding to the main approximation equation shown in FIG. 9 and FIG. 10. This modification makes it possible to reduce the overall memory size the calculation load of the control device 30.

Third Exemplary Embodiment

A description will be given of the control device 30A according to the third exemplary embodiment with reference to FIG. 11 to FIG. 16.

The control device 30A according to the third exemplary embodiment performs a method of calculating harmonic currents to be superimposed over the fundamental current, which is different from the method performed by the control device 30 according to the first exemplary embodiment previously described. That is, the control device 30A uses the suppression range including the (6M−2)-th electromagnetic force component and the 6M-th electromagnetic force component. The control device 30A superimposes the (6M−1)-th harmonic current and the (6M+1)-th harmonic current over the fundamental current.

In particular, the third exemplary embodiment will explain the case of M=2. The control device 30A uses the eleventh harmonic current as the primary harmonic currents IHU1, IHV1 and IHW1, and the twelfth harmonic current as the secondary harmonic currents IHU2, IHV2 and IHW2.

In other words, the control device 30A according to the third exemplary embodiment uses the suppression range including the tenth electromagnetic force component and the twelfth electromagnetic force component, and superimposes the eleventh harmonic current and the thirteenth harmonic current over the fundamental current, and converts electromagnetic force components within the suppression range to fourteenth electromagnetic force component.

It is also possible to apply the method performed by the control device 30A according to the third exemplary embodiment to the case, similar to the second exemplary embodiment, in which the fourteenth electromagnetic force component and the eleventh electromagnetic force component are in the suppression range, and the thirteenth harmonic current and the eleventh harmonic current are superimposed over the fundamental current.

Figure 11:
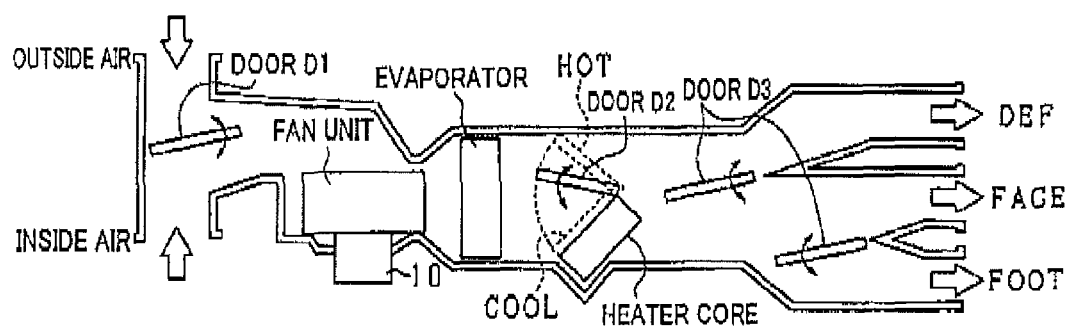
FIG. 11 is a schematic view showing an internal structure of an in-vehicle air conditioner system mounted on a vehicle.

FIG. 11 is a schematic view showing an internal structure of the in-vehicle A/C system. As shown in FIG. 11, Doors (or fan aperture doors) D1, D2 and D3 are arranged in the inside of the in-vehicle A/C system. The door D1 switches between an outside air intake mode and an inside air intake mode. Usually, the control device 30A selects the outside air intake mode. The door D2 adjusts a mixing ratio of cool air and warm air in an air flow passage of the in-vehicle A/C system. The Door D2 is adjusted to a position corresponding to a set temperature of the in-vehicle A/C system. The door D3 switches the air outlet section which is adjusted to a position corresponding to the temperature of the in-vehicle A/C system.

The in-vehicle A/C system has three air outlet sections, i.e. a defender mode (or an anti-fogging mode), a face mode, and a foot mode.

A fan unit is arranged at a downstream side of the door D1 and at an upstream side of an evaporator. The motor 10 drives this fan unit. The motor 10 and the fan unit form an air flow assembly. The air flow passage P measured from the fan unit to the wind outlet sections is changed according to the position of the door D2 and the door D3. Accordingly, the load of the motor 10 varies due to the set temperature and the air flow mode. Each of the doors D1, D2 and D3 is driven by a servo motor (not shown).

The A/C ECU 100 generates and transmits instruction signals to the motor 10 and the control device for each servomotor.

When the in-vehicle A/C system is driven by manual operation, the driver of the vehicle adjusts the temperature of the air in the compartment, the type of the air flow mode, and an air supply amount.

The A/C ECU 100 calculates a temperature instruction value T* which is a temperature at the air flow or air blower so that the temperature of the inside air in the compartment becomes the set temperature indicated by the driver of the vehicle. The A/C ECU 100 calculates an air flow mode instruction value A* on the basis of the air flow mode set by the driver of the vehicle.

Further, the A/C ECU 100 calculates an angular velocity instruction value $\omega m^*$ of the motor 10 on the basis of the air flow amount set by the driver of the vehicle.

When the in-vehicle A/C system is automatically driven, the driver of the vehicle sets a temperature of the inside air in the compartment only. The A/C ECU 100 calculates the temperature instruction value T*, the air flow mode instruction value A*, and the angular velocity instruction value ωm* so that the temperature of the inside air in the compartment of the vehicle becomes the set temperature set temperature indicated by the driver of the vehicle.

The control device 30A according to the third exemplary embodiment receives the instruction values and signals generated by the A/C ECU 100. The control device 30A further calculates the amplitude and phase of each of harmonic currents to be superimposed over the fundamental current according to the conditions indicated by the received instruction values and signals.

On the other hand, the control device 10 according to the first and second exemplary embodiments previously described calculates the amplitude and phase of each of harmonic currents to be superimposed over the fundamental current on the basis of the detected fundamental current which flows in the motor 10. Accordingly, when the temperature instruction value T* and the air flow mode instruction value A* are changed, the control device 309 changes the amplitude and phase of each of the calculated harmonic currents after the fundamental current is detected, which has been varied due to these changed instruction values.

On the other hand, when the temperature instruction value T* and the air flow mode instruction value A* are changed, the control device 30A according to the third exemplary embodiment changes the amplitude and phase of each of harmonic currents to be superimposed over the fundamental current on the basis of the changed temperature instruction value T* and the changed air flow mode instruction value A*.

The control device 30A according to the third exemplary embodiment changes the amplitude and phase of each of the harmonic currents to be superimposed over the fundamental current before the fundamental current flowing in the motor 10 changes when the instruction values generated by the A/C ECU 100. Accordingly, when compared with the method of calculating the amplitude and phase of the harmonic current to be superimposed over the fundamental current which flows in the motor 10, the control device 30A according to the third exemplary embodiment has an improved transition responsiveness capable of superimposing the harmonic current over the fundamental current. Still further, the control device 30A according to the third exemplary embodiment does not require the current sensor 15 capable of detecting the fundamental current.

A description will now be given of the functions of the control device 30A according to the third exemplary embodiment.

Figure 12:
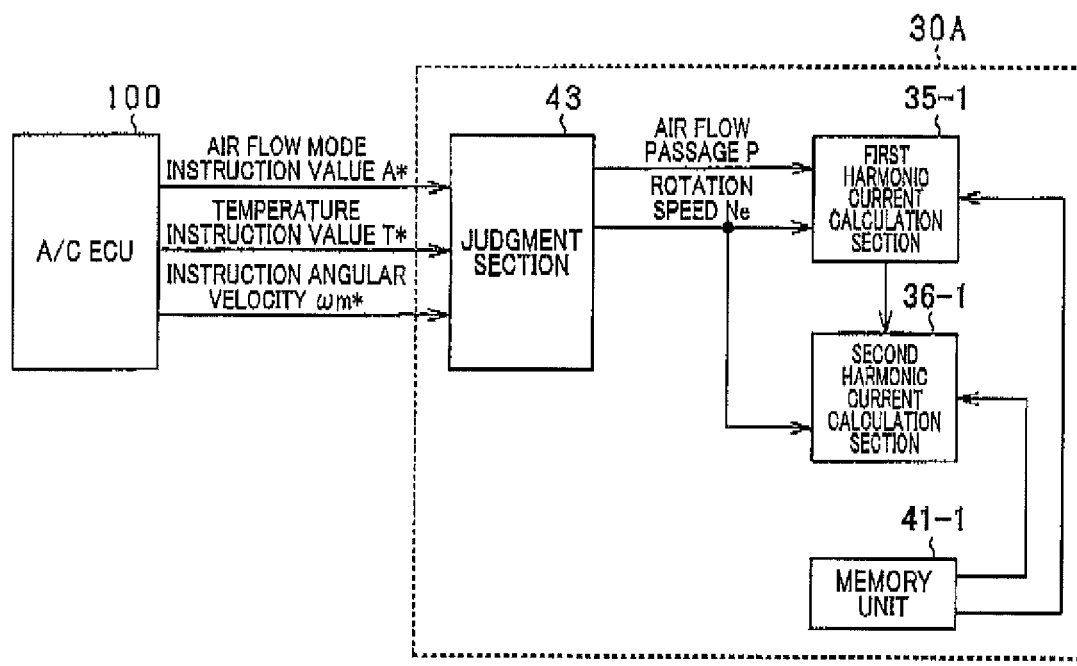
FIG. 12 is a schematic view showing a partial structure of a motor system having a rotating electric machine and a control device therefor according to a third exemplary embodiment of the present invention.

FIG. 12 is a schematic view showing a partial structure of the motor system having the control device 30A and the motor 10 according to the third exemplary embodiment.

The control device 30A has a judgment section 43, a first harmonic current calculation section 35-1, a second harmonic current calculation section 36-1, and a memory unit 41-1.

The control device 30A has the function of the judgment section 43 in addition to the functions of the control device 30. Other components of the control device 30A are the same of the components of the control device 30 as designated by the same reference numbers.

A description will now be given of the function of each of the judgment section 43, the first harmonic current calculation section 35-1, the second harmonic current calculation section 36-1 and the memory unit 41-1.

The judgment section 43 judges the conditions of the instruction values generated nu the A/C ECU 100. For example, the judgment section 43 judges the air flow mode instruction value A*, the temperature instruction value T* and the angular velocity instruction value ωm* as the conditions to be judged. In more detail, the judgment section 43 determines the air flow passage P measured from the fan unit to the wind outlet section on the basis of the air flow mode instruction value A* and the temperature instruction value T*, and determines a target rotation speed Ne of the motor 10 on the basis of the angular velocity instruction value ωm*.

The control device 10A stores, in advance into the memory unit 41-1, the map or approximation equations which represent the correlation relationship between the amplitude I11 and phase β11 of the eleventh harmonic current as the main harmonic current, and the volume P of the airflow passage and the rotation speed Ne of the motor 10.

Figure 13:
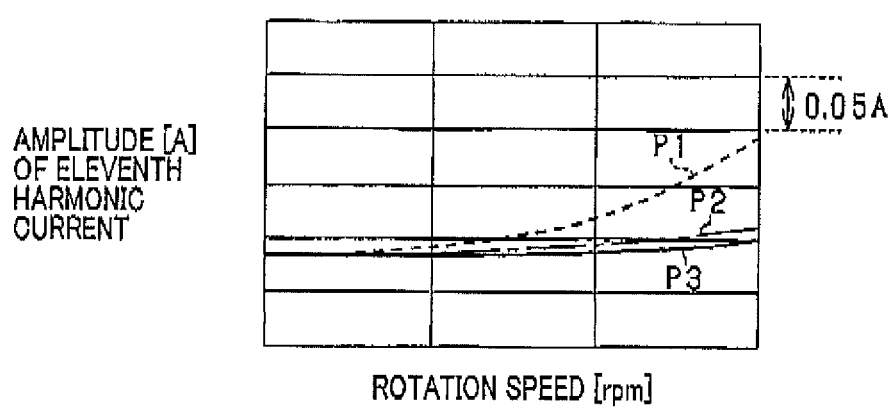
FIG. 13 is a view showing a relationship between the amplitude of the eleventh harmonic current, the rotation speed Ne of the motor and the air flow passages when the tenth electromagnetic force component and the twelfth electromagnetic force component are reduced.
Figure 14:
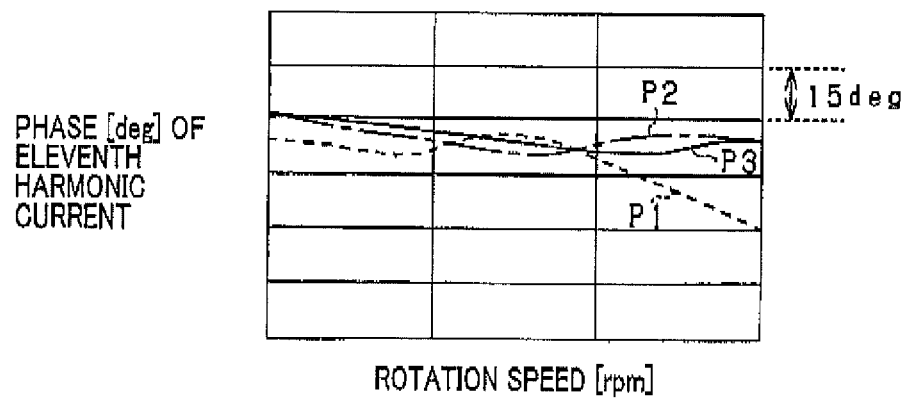
FIG. 14 is a view showing a relationship between the phase of the eleventh harmonic current, the rotation speed of the motor and types of the air flow passage when the tenth electromagnetic force component and the twelfth electromagnetic force component are reduced.

FIG. 13 is a view showing the correlation relationship between the amplitude I11 of the eleventh harmonic current as the main harmonic current, the air flow passage P and the rotation speed of the motor 10. FIG. 14 is a view showing the correlation relationship between the phase β11 of the eleventh harmonic current, the air flow passage and the rotation speed of the motor 10.

As shown in FIG. 13 and FIG. 14, there are three air flow passages P (P1, P2 and P3). The correlation relationship of them can be determined in advance by the experiments and simulation.

The main approximation equations indicating the correlation relationships shown in FIG. 13 and FIG. 14 can be expressed by the following equations (13) and (14).

In the approximation equations (13) and (14), each of i and j indicates the order, Kij and Aij are approximation coefficients, respectively.

The main approximation equations expressed by the equations (13) and (14), and the map indicating the correlation relationships shown in FIG. 13 and FIG. 14 are stored in advance into the memory unit 41-1.

When the main approximation equations are stored into the memory unit 41-1, it is sufficient to store the expansion equations including predetermined orders $$I11 = \Sigma_i \Sigma_j \{K_{ij} \cdot P^i \cdot Ne^j\} \tag{13}$$

$$\beta 11 = \Sigma_i \Sigma_j \{A_{ij} \cdot P^i \cdot Ne^j\} \tag{14}$$

Still further, in to the memory unit 41-1, the sub-approximation equations associated with the angular velocity instruction value ωm* are stored in advance. The sub-approximation equations represent the approximation relationship between the relationship relating to the amplitude I11 of the eleventh harmonic current and the amplitude I13 of the thirteenth harmonic current, and the relationship relating to the phase β11 of the eleventh harmonic current and the phase β13 of the thirteenth harmonic current.

These sub-approximation equations can be expressed by the following equations (15) and (16).

$$I13 = Km \cdot I11 \tag{15}$$

$$\beta 13 = \beta 11 + \Delta \beta m \tag{16}$$

where Km indicates a compensation coefficient, and Δβm designates a correction term.

The first harmonic current calculation section 35-1 calculates the amplitude I11 and phase β11 of the eleventh harmonic current on the basis of the determined the air flow passage P, the rotation speed Ne of the motor 10, and the main approximation equations or the map stored in the memory unit 41-1.

The second harmonic current calculation section 36-1 calculates the amplitude I13 and phase β13 of the thirteenth harmonic current on the basis of the amplitude I11 and the phase β11 of the eleventh harmonic current calculated by the first harmonic current calculation section 35-1 and the equations (15) and (16 corresponding to the angular velocity instruction value ωm*.

It is acceptable to use the thirteenth harmonic current as the main harmonic current, and store, in advance into the memory unit 14-1, the approximation equations (13) and (14) as the main approximation equations showing the correlation relationship between each of the amplitude I13 and the phase β13 of the thirteenth harmonic current, the air flow passage P and the rotation speed Ne of the motor 10.

Figure 15:
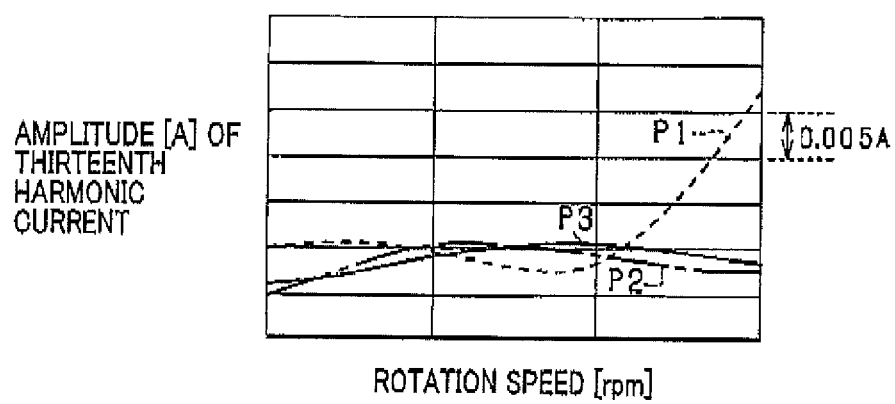
FIG. 15 is a view showing a relationship between the amplitude of the thirteenth harmonic current, the rotation speed of the motor and types of the air flow passage when the tenth electromagnetic force component and the twelfth electromagnetic force component are reduced.
Figure 16:
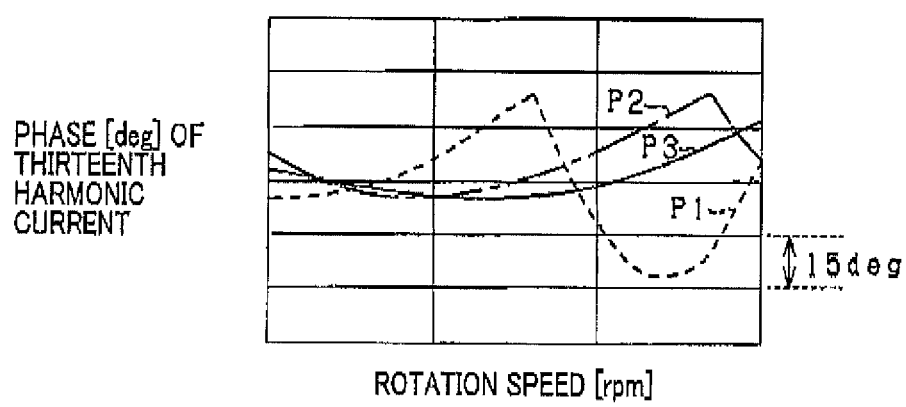
FIG. 16 is a view showing a relationship between the phase of the thirteenth harmonic current, the rotation speed of the motor and types of the air flow passage when the tenth electromagnetic force component and the twelfth electromagnetic force component are reduced.

It is also acceptable to use the thirteenth harmonic current as the main harmonic current, and store, in advance into the memory unit 14-1, the map representing the correlation relationship shown FIG. 15 and FIG. 16.

FIG. 15 is a view showing the correlation relationship between the amplitude of the thirteenth harmonic current, the rotation speed of the motor and the air flow passage when the tenth electromagnetic force component and the twelfth electromagnetic force component are reduced. FIG. 16 is a view showing a correlation relationship between the phase of the thirteenth harmonic current, the rotation speed of the motor and the air flow passage when the tenth electromagnetic force component and the twelfth electromagnetic force component are reduced.

The control device 30A according to the third exemplary embodiment has the following effects (6) to (8) in addition to the effects (2) to (5) obtained by the control device 30 according to the first and second exemplary embodiments previously described.

(6) In the third exemplary embodiment, the correlation relationship between the instruction values effecting the load of the motor 10, the amplitudes I11 and I13 and phases β11, β13 of the harmonic currents to be superimposed over the basis current has been stored in the memory unit 41-1. The control device 30A calculates the amplitudes I11 and I13 and phases β11, β13 of the harmonic currents to be superimposed over the basis current on the basis of the correlation relationship and the instruction values. That is, the control device 30A calculates the harmonic currents IHU1, IVH1, IWH1, IUH2, IVH2 and IWH2 according to the instruction values relating the load of the motor 10. Accordingly, even if the load of the motor 10 is changed, the harmonic currents corresponding to the load change of the motor 10 are superimposed over the fundamental current. Accordingly, it is possible for the control device 30A to effectively reduce electromagnetic force components which cause noise even if the instruction values which affect the load change of the motor 10 vary.

(7) The air flow passage P, i.e. the load of the motor 10 is changed according to the air flow mode and the set temperature of the in-vehicle A/C conditioning system. Accordingly, it is possible for the control device 30A to calculate the harmonic currents corresponding to the air flow mode instruction value A* and the temperature instruction value T*, and superimpose the harmonic currents corresponding to the load change of the motor 10 over the fundamental current.

(8) The air flow passage P is determined on the basis of the air flow mode instruction value A* and the temperature instruction value T*. The amplitudes I11 and I13 and phases β11, β13 of the harmonic currents are calculated on the basis of the correlation relationship between the air flow passage P, the rotation speed Ne of the motor 10, and the amplitude of the harmonic current. Further, the phases β11, β13 of the harmonic currents are calculated on the basis of the correlation relationship between the air flow passage P, the rotation speed Ne of the motor 10 and the phase of the harmonic current. The control device 30A can superimpose the harmonic currents corresponding to the load and the rotation speed of the motor 10 over the fundamental current.

(Other Modifications)

The concept of the present invention is not limited by the first to third exemplary embodiments previously described.

The phase of the fundamental current is changed due to the change of the load of the motor 10 under the state in which the three phase fundamental current is not in equilibrium. For this reason, it is acceptable to use the amplitude and phase of the harmonic currents as the conditions of the fundamental current, prepared and stored, in advance into the memory unit, the approximation equation showing the amplitude of the harmonic currents to be superimposed over the amplitude of the fundamental current, and the approximation equation showing the phase of the harmonic currents to be superimposed over the phase of the fundamental current.

In each of the first to third exemplary embodiments, when three or more harmonic currents are superimposed over the fundamental current, it is sufficient to use at least one of them is used as the main fundamental current, and store the main approximation relationship representing the amplitude and phase of the fundamental current and the conditions of the fundamental current into the memory unit 41, 41-1. Further, it is sufficient to store, into the memory unit 41, 41-1, the sub-approximation equation representing the relationship in amplitude and phase between the main harmonic current, and the harmonic currents to be superimposed over the fundamental current. This makes it possible to obtain not less than three harmonic currents corresponding to the conditions of the fundamental current. In this case, it is sufficient to store in advance the map as the main approximation equation into the memory unit 41, 41-1.

Each of the first to third exemplary embodiments shows the case of M=2. However, the concept of the present invention is not limited by this. The amplitude and phase of the harmonic currents to be superimposed over the fundamental current are changed due to the conditions of the fundamental current when M is a value other than 2. Accordingly, when M is a value other than 2, similar to the method shown in each of the first to third exemplary embodiments, it is sufficient to prepare in advance and store, into the memory unit 41, 41-1, the main approximation equation or the map relating to the main approximation equation and the sub-approximation equations. The main approximation equation and the sub-approximation equations are changed due to the value of M.

It is sufficient to determine the suppression range of electromagnetic force according to the characteristics of the motor, and prepare the main approximation equation and the sub-approximation equations according to the suppression range of electromagnetic force.

It is also acceptable to generate approximation equations relating to the conditions of the fundamental current and the amplitude and phase of the overall of harmonic currents to be superimposed over the fundamental current, and store the approximation equations into the memory unit. That is, it is, possible to prepare the main approximation equations for the overall harmonic currents without using the sub-approximation equation. Although this method requires additional memory size, it is possible to store the map relating to the correlation relationship of the main approximation equations for the overall harmonic currents into the memory unit.

It is possible for the control device 30 to execute both the control method explained in the first exemplary embodiment and the control method explained in the second exemplary embodiment. This makes it possible for each of the control device 30 and the control device 30A to select the electromagnetic force within the suppression range on the basis of the operation state of the rotation angular velocity ωm, etc. of the motor 10.

The control device according to each of the first to third exemplary embodiment superimposes the harmonic currents over the fundamental current. However, the concept of the present invention is not limited by the first to third exemplary embodiments previously described. It is acceptable to superimpose one odd-number order harmonic currents over the fundamental current. In this case, it is sufficient to prepare the approximation equation or map relating to the conditions of the fundamental current and the amplitude and phase of the harmonic current to be superimposed over the fundamental current, and store the approximation equation or map into the memory unit 41, 41-1.

It is possible to combine the control devices 30, 30A according to the first to third exemplary embodiments. That is, it is possible to store into the memory unit in advance, the correlation relationship between the conditions of the basis current and the amplitude and phase of the harmonic currents, the correlation relationship between the instruction values and the amplitude and phase of the harmonic currents. In this case, the control device switches these correlation relationships in order to calculate the amplitude and phase of the harmonic currents to be superimposed over the basis current. Further, it is acceptable to correct the amplitude and phase of the harmonic currents calculated based on the conditions of the instruction values. This makes it possible to further improve the transition responsiveness of the harmonic currents to be superimposed over the basis current.

It is acceptable to use an observer unit capable of detecting a drive current flowing in the motor 10 instead of using the current sensor 15. That is, it is possible to use the observer unit capable of acquiring the current value of the basis current instead of using the current value acquirement section such as the LPF 42.

It is acceptable to use a torque of the motor 10 as the control value of the motor 10 instead of using the rotation angular velocity.

It is possible to use a motor of a distributed winding type motor instead of using the permanent magnet synchronous motor of a three phase concentrated winding. It is also acceptable to use an inner rotor type motor in addition to the outer rotor type motor. It is possible to apply the concept of the present invention to motors having a different type winding and rotor type which cause noise based on the rotor resonance phenomenon.

Further, it can be considered that the motor 10 can generate noise on the basis of the resonance phenomenon of the stator 12 only, or a combination of the stator 12 and the rotor 10. It is possible to apply the concept of the control device according to the present invention to these cases.

It is possible to apply the concept of the present invention to multiple phase motor of not less than four phases in addition to three phase motors. It is possible to apply the concept of the control device according to the present invention to winding field type synchronous motors in which a rotor has a field winding in addition to permanent magnet field type synchronous motors.

It is possible to apply the concept of the control device according to the present invention to various types of motors in addition to the motor 10 such as blower motors. It is possible to apply each of the first to third exemplary embodiments to motors as long as the load of the motor varies even if its rotation angular velocity ωm is constant.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A control device for a rotating electric machine arranged in a rotating electric machine system, the rotating electric machine system comprising an electric power conversion unit and the rotating electric machine, the rotating electric machine comprising a stator on which phase windings are wound, the electric power conversion unit supplying a drive current to the phase windings of the stator to drive the rotating electric machine, the control device comprising:

a harmonic current calculation section capable of calculating harmonic currents to be superimposed over a fundamental current to be supplied to the phase windings of the stator so as to suppress electromagnetic force components affecting the rotating electric machine;

an operation section capable of operating the electric power conversion unit so that the drive current including the calculated harmonic currents which have been superimposed over the fundamental current flows in the phase windings of the stator, wherein the harmonic current calculation section calculates the amplitude and phase of the harmonic currents to be superimposed over the fundamental current on the basis of conditions corresponding to a load of the rotating electric machine; and a judgment section capable of judging conditions of instruction values generated by and transmitted from another control device, wherein the conditions of the instruction values affect the load of the rotating electric machine, the harmonic current calculation section calculates the amplitude and phase of the harmonic currents to be superimposed over the fundamental current on the basis of the correlation relationship between the amplitude and phase of the harmonic currents, and the conditions of the fundamental current judged by the judgment section, where the correlation relationship has been determined in advance, the rotating electric machine forms a fan unit, and the control device uses an air flow mode as the conditions of the instruction values, the control device uses a set temperature as the conditions of the instruction values, the judgment section judges an instruction value of a rotation angular velocity of the rotating electric machine generated by and transmitted from the another control device, the judgment section judges an air flow passage through which the blowing air is supplied from the fan unit on the basis of the air flow mode and the set temperature as the instruction values, and the control device uses, as the correlation relationships between the conditions of the instruction values and the amplitude and phase of the harmonic currents, a relationship between the air flow passage, the rotation angular velocity of the rotating electric machine and the amplitude of the harmonic currents, and a relationship between the air flow passage, the rotation angular velocity of the rotating electric machine, and the phase of the harmonic currents.

2. The control device according to claim 1, further comprising:

an acquiring section capable of detecting the fundamental current flowing in the phase windings of the stator, wherein the conditions corresponding to the load of the rotating electric machine are conditions of the fundamental current flowing in the phase windings of the stator, and the harmonic current calculation section calculates the amplitude and phase of the harmonic currents to be superimposed over the fundamental current which flows in the phase windings of the stator on the basis of the correlation relationship between the conditions of the fundamental current and the amplitude and phase of the harmonic currents, and the conditions of the fundamental current detected by the acquiring section, where the correlation relationship has been determined in advance.

3. The control device according to claim 1, further comprising:

an acquiring section capable of detecting the fundamental current flowing in the phase windings of the stator; and a judgment section capable of judging the conditions of instruction values generated by and transmitted from another control device, wherein the conditions of the fundamental current flowing in the phase windings of the stator and the conditions of the instruction values affect the load of the rotating electric machine, a first correlation relationship between the conditions of the fundamental current and the amplitude and phase of the harmonic currents, a second correlation relationship between the conditions of the instruction values and the amplitude and phase of the harmonic currents have been determined in advance, and the harmonic current calculation section calculates the amplitude and phase of the harmonic currents to be superimposed over the fundamental current on the basis of the first correlation relationship and the conditions of the fundamental current acquired by the acquiring section, or the second correlation relationship and the conditions of the instruction values judged by the judgment section.

4. The control device according to claim 1, wherein the control device uses the amplitude of the fundamental current as the conditions of the fundamental current.

5. The control device according to claim 4, wherein the harmonic current calculation section increases the amplitude of the harmonic currents to be superimposed over the fundamental current according to increase of the amplitude of the fundamental current detected by the acquiring section.

6. A control device for a rotating electric machine arranged in a rotating electric machine system, the rotating electric machine system comprising an electric power conversion unit and the rotating electric machine, the rotating electric machine comprising a stator on which phase windings are wound, the electric power conversion unit supplying a drive current to the phase windings of the stator to drive the rotating electric machine, the control device comprising:

a harmonic current calculation section capable of calculating harmonic currents to be superimposed over a fundamental current to be supplied to the phase windings of the stator so as to suppress electromagnetic force components affecting the rotating electric machine;

an operation section capable of operating the electric power conversion unit so that the drive current including the calculated harmonic currents which have been superimposed over the fundamental current flows in the phase windings of the stator, wherein the harmonic current calculation section calculates the amplitude and phase of the harmonic currents to be superimposed over the fundamental current on the basis of conditions corresponding to a load of the rotating electric machine; and an acquiring section capable of detecting the fundamental current flowing in the phase windings of the stator, wherein the conditions corresponding to the load of the rotating electric machine are conditions of the fundamental current flowing in the phase windings of the stator, wherein the harmonic current calculation section calculates the amplitude and phase of the harmonic currents to be superimposed over the fundamental current which flows in the phase windings of the stator on the basis of the correlation relationship between the conditions of the fundamental current and the amplitude and phase of the harmonic currents, and the conditions of the fundamental current detected by the acquiring section, where the correlation relationship has been determined in advance, wherein a K-th angular velocity is K times (K is an integer not less than two) of a variable angular velocity of the fundamental current flowing in the phase windings of the stator, a K-th harmonic current has a K-th angular velocity as a variable angular velocity, a K-th electromagnetic force component has a K-th angular velocity and affects the rotating electric machine, and wherein when the suppression range of the electromagnetic force is from L-th (L is an even number not less than two) to (N−2)-th (N is an even number not less than two) which is larger than L-th, or from L-th to (N+2)-th which is smaller than L-th, the harmonic current calculation section calculates a plurality of even numbered harmonic currents within an order range from L-th to N-th.

7. The control device according to claim 6, wherein at least one of the harmonic currents to be superimposed over the fundamental current are main harmonic currents, and wherein the control device further comprises:

a memory unit capable of storing a main approximation equation or a map and sub-approximation equations, wherein the main approximation equation or the map represents a correlation relationship of the harmonic currents, the sub-approximation equations represent a relationship between amplitude and phase of the harmonic currents other than the main harmonic currents to be superimposed over the fundamental current which flows in the phase windings of the stator, and the amplitude and phase of the main harmonic currents, and the harmonic current calculation section calculates the amplitude and phase of the harmonic currents to be superimposed over the fundamental current on the basis of the main approximation equation or the map, and the sub-approximation equations.

8. The control device according to claim 6, further comprising:

a memory unit capable of storing approximation equations, each representing a correlation relationship of each of the harmonic currents to be superimposed over the fundamental current, wherein the harmonic current calculation section calculates the amplitude and phase of the harmonic currents to be superimposed over the fundamental current on the basis of the approximation equation stored in the memory unit.

9. The control device according to claim 6, wherein when the suppression range contains the (6M−2)-th electromagnetic force component and the 6M-th electromagnetic force component, the harmonic current calculation section calculates the (6M−1)-th harmonic current and the (6M+1)-th harmonic current.

10. The control device according to claim 6, wherein when the suppression range contains the 6M-th electromagnetic force component and the (6M+2)-th electromagnetic force component, the harmonic current calculation section calculates the (6M−1)-th harmonic current and the (6M+1)-th harmonic current.

11. The control device according to claim 7, wherein when the suppression range contains the (6M−2)-th electromagnetic force component and the 6M-th electromagnetic force component, the memory unit stores the main approximation equation or the map representing the correlation relationship of one of the (6M−1)-th harmonic current and the (6M+1)-th harmonic current, and the sub approximation equations representing the relationship between the amplitude and phase of the (6M−1)-th harmonic current and the amplitude and phase of the (6M+1)-th harmonic current, and the harmonic current calculation section calculates the (6M−1)-th harmonic current and the (6M+1)-th harmonic current to be superimposed over the fundamental current flowing in the phase windings of the stator on the basis of the main approximation equation or the map, and the sub-approximation equations.

12. The control device according to claim 7, wherein when the suppression range contains the 6M-th electromagnetic force component and the (6M+2)-th electromagnetic force component, the memory unit stores the main approximation equation or the map representing the correlation relationship between representing one of the (6M−1)-th harmonic current and the (6M+1)-th harmonic current, and the sub approximation equations representing the relationship between the amplitude and phase of the (6M−1)-th harmonic current and the amplitude and phase of the (6M+1)-th harmonic current, and the harmonic current calculation section calculates the (6M−1)-th harmonic current and the (6M+1)-th harmonic current to be superimposed over the fundamental current flowing in the phase windings of the stator on the basis of the main approximation equation or the map, and the sub-approximation equations.

* * * * *